United States Patent
Fujishima et al.

(10) Patent No.: US 11,624,903 B2
(45) Date of Patent: Apr. 11, 2023

(54) LIGHT DEFLECTOR, LIDAR DEVICE, AND IMAGE FORMING APPARATUS

(71) Applicants: Masayuki Fujishima, Kanagawa (JP); Nobunari Tsukamoto, Osaka (JP)

(72) Inventors: Masayuki Fujishima, Kanagawa (JP); Nobunari Tsukamoto, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 15 days.

(21) Appl. No.: 16/892,792

(22) Filed: Jun. 4, 2020

(65) Prior Publication Data

US 2020/0400940 A1 Dec. 24, 2020

(30) Foreign Application Priority Data

Jun. 20, 2019 (JP) .............................. JP2019-114951

(51) Int. Cl.
| | | |
|---|---|---|
| G02B 26/08 | (2006.01) | |
| G01S 7/481 | (2006.01) | |
| G02B 26/10 | (2006.01) | |
| G02B 27/01 | (2006.01) | |
| G03G 15/04 | (2006.01) | |

(52) U.S. Cl.
CPC ........ G02B 26/0858 (2013.01); G01S 7/4817 (2013.01); G02B 26/10 (2013.01); *G02B 27/0101* (2013.01); *G03G 15/04036* (2013.01)

(58) Field of Classification Search
None
See application file for complete search history.

(56) References Cited

U.S. PATENT DOCUMENTS

| | | | |
|---|---|---|---|
| 2012/0250130 A1 | 10/2012 | Naono | |
| 2014/0300942 A1* | 10/2014 | Van Lierop | G02B 26/0833 359/198.1 |
| 2015/0277108 A1* | 10/2015 | Ogawa | G02B 26/101 359/199.4 |
| 2017/0350759 A1 | 12/2017 | Azumi et al. | |
| 2017/0374325 A1 | 12/2017 | Itoh et al. | |
| 2018/0215608 A1 | 8/2018 | Fujishima et al. | |
| 2018/0252578 A1 | 9/2018 | Suzuki et al. | |
| 2018/0267293 A1 | 9/2018 | Fujishima et al. | |
| 2019/0129163 A1 | 5/2019 | Van Lierop et al. | |

(Continued)

FOREIGN PATENT DOCUMENTS

| | | |
|---|---|---|
| JP | 2000-214407 | 8/2000 |
| JP | 2010-097135 | 4/2010 |
| JP | 2012-208352 | 10/2012 |

(Continued)

OTHER PUBLICATIONS

Extended European Search Report for 20177935.2 dated Oct. 15, 2020.
Japanese Office Action for 2019-114951 dated Nov. 29, 2022.

*Primary Examiner* — Jennifer D. Carruth
(74) *Attorney, Agent, or Firm* — IPUSA, PLLC

(57) ABSTRACT

A light deflector includes a reflector having a reflecting surface, a movable part coupled to the reflector, a drive circuit configured to cause the movable part to deform so as to oscillate the reflector, a supporting unit having an opening in part; and a spring having a bending structure. The spring is disposed between the movable part and the supporting unit, the spring coupled to each of the movable part and the supporting unit.

16 Claims, 20 Drawing Sheets

(56) References Cited

U.S. PATENT DOCUMENTS

2019/0285877 A1\* 9/2019 Ogino ................ G02B 27/0101
2022/0137398 A1\* 5/2022 Seto ...................... G01S 7/4817
356/4.01

FOREIGN PATENT DOCUMENTS

| JP | 2014-126715 | 7/2014 |
| JP | 2017-219533 | 12/2017 |
| JP | 2018-122391 | 8/2018 |
| JP | 2018-146242 | 9/2018 |
| JP | 2018-155816 | 10/2018 |
| JP | 2019-152694 | 9/2019 |
| JP | 2019-159067 | 9/2019 |
| WO | 2011/027742 | 3/2011 |
| WO | WO2013/055210 A1 | 4/2013 |

\* cited by examiner

LIGHT DEFLECTOR, LIDAR DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2019-114951, filed on Jun. 20, 2019, in the Japan Patent Office, the entire disclosure of which is hereby incorporated by reference herein.

BACKGROUND

Technical Field

Embodiments of the present disclosure relate to a light deflector, a light detection and ranging (LiDAR) device incorporating the light deflector, and image forming apparatus incorporating the light deflector.

Related Art

With the development of micromachining technology, development of micro electro mechanical systems (MEMS) devices manufactured by micromachining silicon or glass is advancing. A compact light deflector is known as one of the MEMS devices. For example, a light deflector includes a reflector having a reflecting surface, a movable part coupled to the reflector, a drive circuit to oscillate the reflector by elastically deforming the movable part, and a supporting unit surrounding these elements to support the movable part.

In such a light deflector, it is known that an opening portion is provided in the supporting unit to increase the driving force of the drive unit and increase the deflection angle of the reflector.

However, the size of such an opening portion provided in the supporting unit might change due to the changes in temperature during the packaging of the light deflector and the mounting of the light deflector on the circuit board. With such a change in the size of the opening portion, the movable part might be distorted, and thus the resonance frequency related to the oscillations of the reflector might change.

SUMMARY

In one aspect of this disclosure, there is described an improved light deflector including a reflector having a reflecting surface, a movable part coupled to the reflector, a drive circuit, a supporting unit having an opening in part, and a spring having a bending structure. The drive circuit is configured to cause the movable part to deform so as to oscillate the reflector. The spring is disposed between the movable part and the supporting unit and coupled to each of the movable part and the supporting unit.

Further described is a LiDAR device including the above-described light deflector.

Still further described is an image forming apparatus including the above-described light deflector.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1:
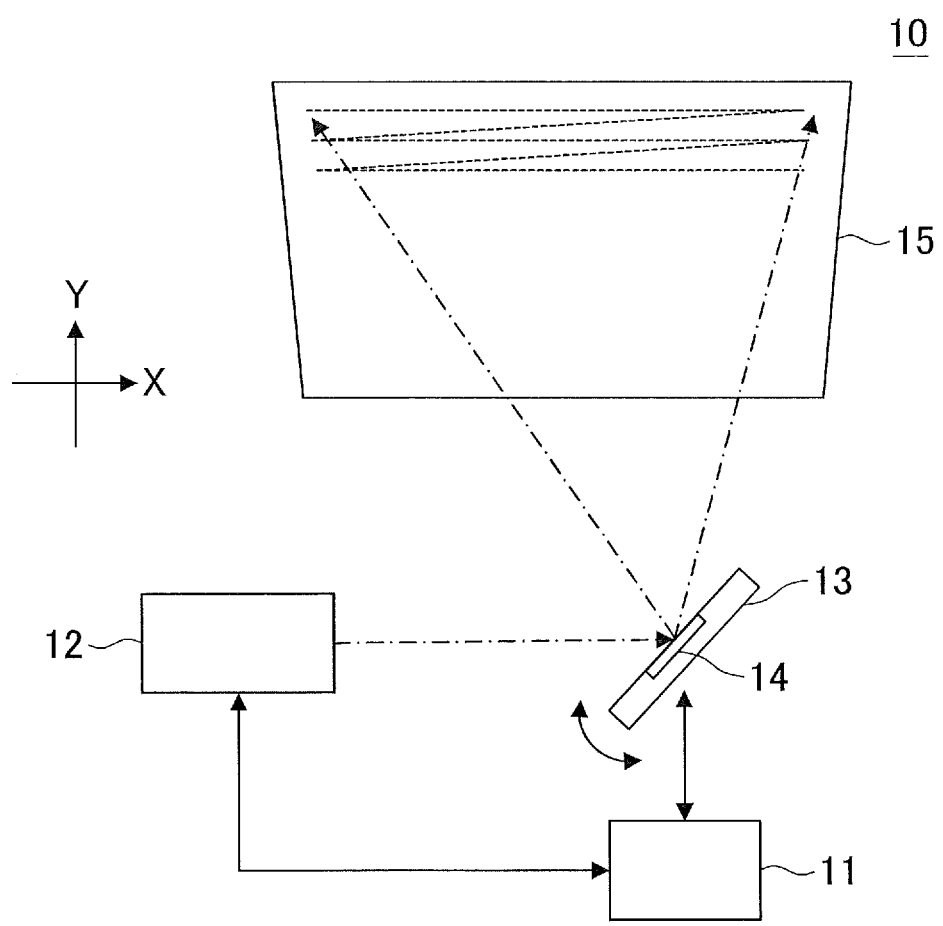
FIG. 1 is a schematic view of an example of an optical scanning system.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Embodiments of the present disclosure are described below in detail.

With initially reference to FIGS. 1 to 4, an optical scanning system to which a movable device according to an embodiment of the present disclosure is applied is described below in detail. FIG. 1 is a schematic view of an example of an optical scanning system 10. As illustrated in FIG. 1, the optical scanning system 10 deflects light emitted from a light-source device 12 under the control of a control device 11, by using a reflecting surface 14 included in a movable device 13, so as to optically scan a target surface 15 to be scanned (hereinafter, referred to as target surface).

The optical scanning system 10 includes the control device 11, the light-source device 12, and the movable device 13 including the reflecting surface 14.

The control device 11 is, for example, an electronic circuit unit including, for example, a central processing unit (CPU) and a field-programmable gate array (FPGA). The movable device 13 is, for example, a micro electro mechanical systems (MEMS) device that includes a reflecting surface 14 and that can move the reflecting surface 14. The movable device 13 is an example of a light deflector.

The light-source device 12 is, for example, a laser device that emits a laser beam. The target surface 15 is, for example, a screen.

The control device 11 generates control instructions of the light-source device 12 and the movable device 13 based on acquired optical-scanning information, and outputs drive signals to the light-source device 12 and the movable device 13 based on the control instructions. The light-source device 12 emits light based on the received drive signal. The movable device 13 rotates and oscillates the reflecting surface 14 in at least one of a uniaxial direction and a biaxial direction, based on the received drive signal.

With this configuration, for example, the reflecting surface 14 of the movable device 13 is biaxially rotated and oscillated in a reciprocating manner within a predetermined range, and the light emitted from the light-source device 12 to be incident on the reflecting surface 14 is uniaxially deflected to perform optical scanning, under the control of the control device 11, which is based on image data that is an example of the optical-scanning information. Accordingly, an image can be projected onto the target surface 15 as desired. The details of the movable device of the present embodiment and the details of the control by the controller are described later.

Figure 2:
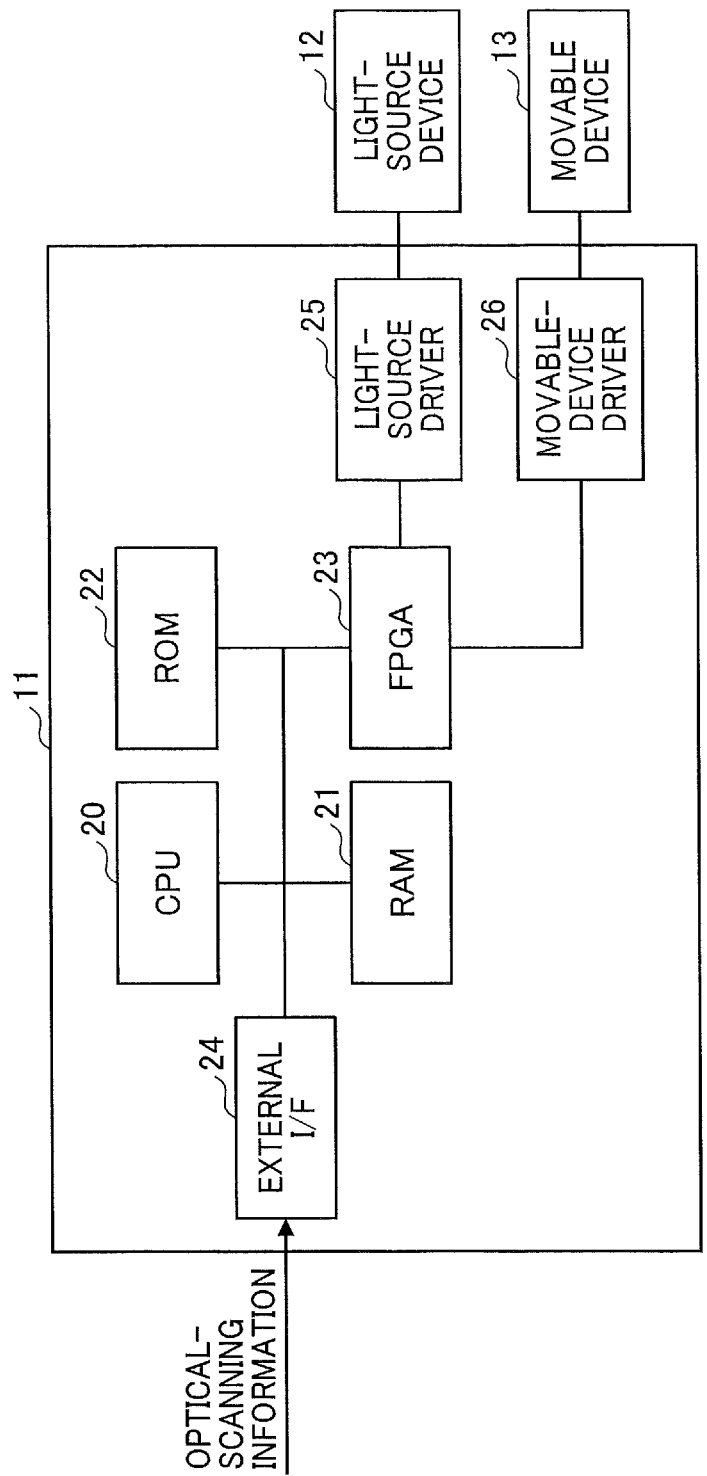
FIG. 2 is a hardware block diagram of an example of the optical scanning system.

Next, the hardware configuration of an example of the optical scanning system 10 is described with reference to FIG. 2. FIG. 2 is a hardware block diagram of an example of the optical scanning system 10. As illustrated in FIG. 2, the optical scanning system 10 includes the control device 11, the light-source device 12, and the movable device 13, which are electrically connected to one another. The control device 11 includes a CPU 20, a random access memory (RAM) 21, a read only memory (ROM) 22, a FPGA 23, an external interface (I/F) 24, a light-source driver 25, and a movable-device driver 26.

The CPU 20 is an arithmetic device that loads into the RAM 21 a program or data from a storage device such as the ROM 22 and executes processing to provide the controls or functions of the entirety of the control device 11.

The RAM 21 is a volatile storage device that temporarily holds a program and data.

The ROM 22 is a non-volatile storage device that can hold a program and data even after the power is turned off, and stores a program and data for processing that is executed by the CPU 20 to control each function of the optical scanning system 10.

The FPGA 23 is a circuit that outputs proper control signals to the light-source driver 25 and the movable-device driver 26 in accordance with the processing performed by the CPU 20.

For example, the external I/F 24 is an interface with respect to an external device or a network. The external device may be, for example, a host device such as a personal computer (PC); or a storage device, such as a universal serial bus (USB) memory, a secure digital (SD) card, a compact disk (CD), a digital versatile disk (DVD), a hard disk drive (HDD), or a solid state drive (SSD). For example, the network may be a controller area network (CAN) of an automobile, a local area network (LAN), or the Internet. The external I/F 24 can have any configuration that can achieve connection to an external device or communication with an external device. The external I/F 24 may be provided for each external device.

The light-source driver 25 is an electric circuit that outputs a drive signal such as a drive voltage to the light-source device 12 in accordance with the received control signal.

The movable-device driver 26 is an electric circuit that outputs a drive signal such as a drive voltage to the movable device 13 in accordance with the received control signal.

In the control device 11, the CPU 20 acquires optical-scanning information from an external device or a network through the external I/F 24. Note that any configuration may be used as long as the CPU 20 can acquire the optical scanning information, and the optical scanning information may be stored in the ROM 22 or in the FPGA 23 in the control device 11, or a storage device such as an SSD may be newly provided in the control device 11 and the optical scanning information may be stored in the storage device.

In this case, the optical-scanning information is information indicating the way of optical scanning to be performed on the target surface 15. For example, the optical-scanning information is image data when an image is displayed by optical scanning. For another example, the optical-scanning information is writing data indicating the order and portion of writing when optical writing is performed by optical scanning. Furthermore, for example, the optical scanning information is irradiation data indicating the timing and range of irradiation of light for object recognition in a case where an object is to be recognized by optical scanning.

The control device 11 can provide the functional configuration described below by using instructions from the CPU 20 and the hardware configuration illustrated in FIG. 2.

Figure 3:
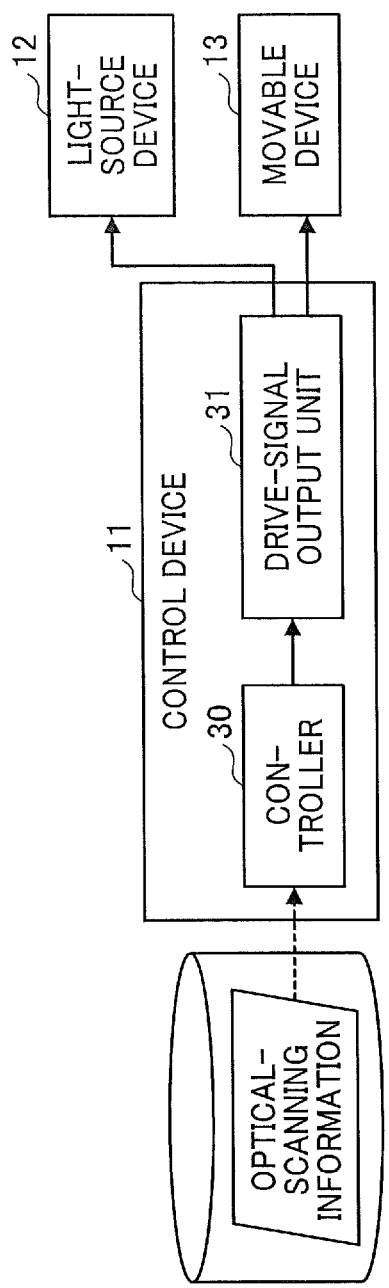
FIG. 3 is a functional block diagram of an example of a control device.

Next, the functional configuration of the control device 11 of the optical scanning system 10 is described below referring to FIG. 3. FIG. 3 is a functional block diagram of the control device 11 according to an embodiment of the present disclosure.

As illustrated in FIG. 3, the control device 11 has the functions of a controller 30 and a driving-signal output unit 31.

The controller 30 is implemented by, for example, the CPU 20, the FPGA 23, and the like. The controller 30 acquires optical-scanning information from an external device, converts the optical-scanning information into a control signal, and outputs the control signal to the drive-signal output unit 31. For example, the controller 30 acquires image data serving as the optical-scanning information from an external device or the like, generates a control signal from the image data through predetermined processing, and outputs the control signal to the drive-signal output unit 31. The drive-signal output unit 31 is implemented by, for example, the light-source driver 25 and the movable-device driver 26. The drive-signal output unit 31 outputs a drive signal to the light-source device 12 or the movable device 13 based on the received control signal.

The drive signal is a signal for controlling the driving of the light-source device 12 or the movable device 13. For example, the drive signal of the light-source device 12 is a drive voltage used to control the irradiation timing and irradiation intensity of the light source. Moreover, for example, the drive signal in the movable device 13 is a drive voltage used to control the timing and range of motion where the reflecting surface 14 provided in the movable device 13 is moved.

Figure 4:
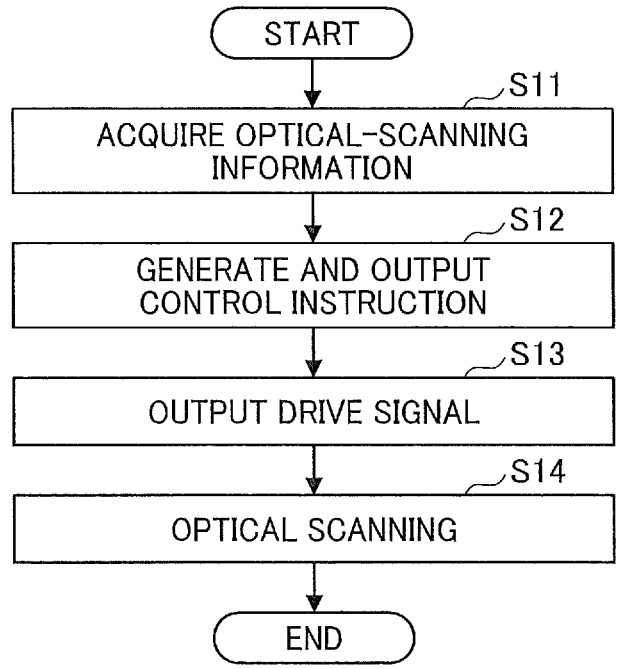
FIG. 4 is a flowchart of an example of processing relating to the optical scanning system.

Next, the process of optically scanning the target surface 15 performed by the optical scanning system 10 is described referring to FIG. 4. FIG. 4 is a flowchart of an example of processing performed by the optical scanning system 10.

In step S11, the controller 30 acquires optical-scanning information from, for example, an external device. In step S12, the controller 30 generates control signals from the acquired optical-scanning information, and outputs the control signals to the drive-signal output unit 31. In step S13, the drive-signal output unit 31 outputs drive signals to the light-source device 12 and the movable device 13 based on the received control signals. In step S14, the light-source device 12 emits light based on the received drive signal. The movable device 13 rotates and oscillates the reflection surface 14 based on the received driving signal. The driving of the light-source device 12 and the movable device 13 causes light to be deflected in a given direction, and optical scanning is performed.

In the above-described optical scanning system 10, a single control device 11 has a device and a function for controlling the light-source device 12 and the movable device 13. However, a control device for the light-source device and a control device for the movable device may be separate elements.

In the above-described optical scanning system 10, a single control device 11 has the functions of the controller 30 and the functions of the drive-signal output unit 31 for the light-source device 12 and the movable device 13. These functions may be implemented by separate elements. For example, a drive-signal output device including a drive-signal output unit 31 may be provided in addition to the control device 11 including the controller 30. An optical deflection system that performs optical deflection may include the movable device 13 including the reflecting surface 14 and the control device 11 of the above-described optical scanning system 10.

An image projection apparatus, to which the movable device according to the embodiment is applied, is described next in detail referring to FIGS. 5 and 6.

Figure 5:
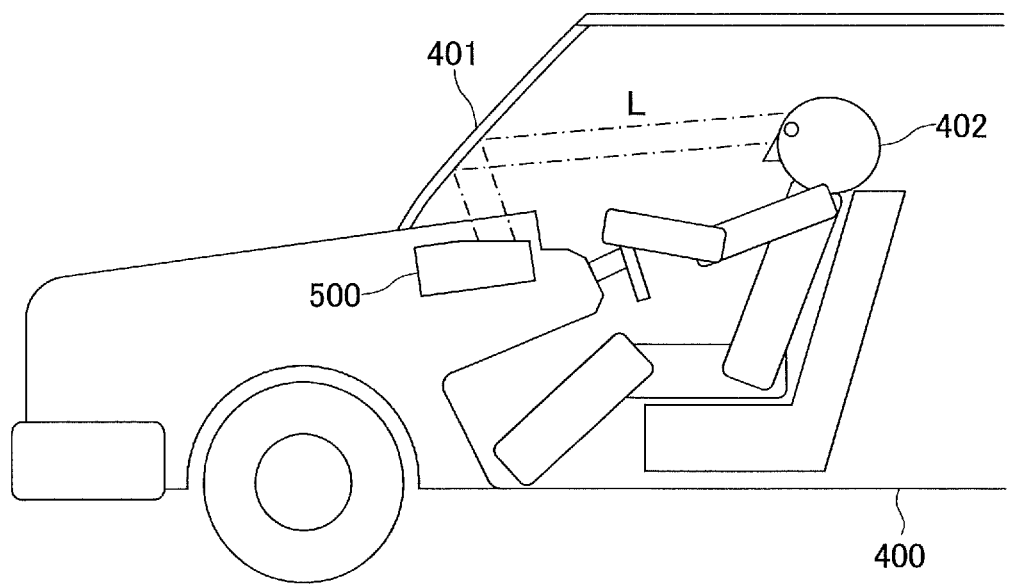
FIG. 5 is a schematic view of an example of a vehicle equipped with a head-up display device (HUD)

FIG. 5 is a schematic view of a vehicle 400 equipped with a HUD 500 as an example of an image projection apparatus according to the embodiment. FIG. 6 is a schematic view of an example of the HUD 500.

The image projection apparatus is an apparatus that projects an image by optical scanning, and is, for example, a HUD.

As illustrated in FIG. 5, for example, the HUD 500 is disposed, for example, near a windshield 401 of the vehicle 400. Projection light L that is emitted from the HUD 500 is reflected by the windshield 401 and directed to an observer (a driver 402) as a user. Accordingly, the driver 402 can visually recognize an image or the like projected by the HUD 500, as a virtual image. Alternatively, a combiner may be disposed on the inner wall surface of the windshield 401 so that the user can visually recognize a virtual image formed by the projection light that is reflected by the combiner.

Figure 6:
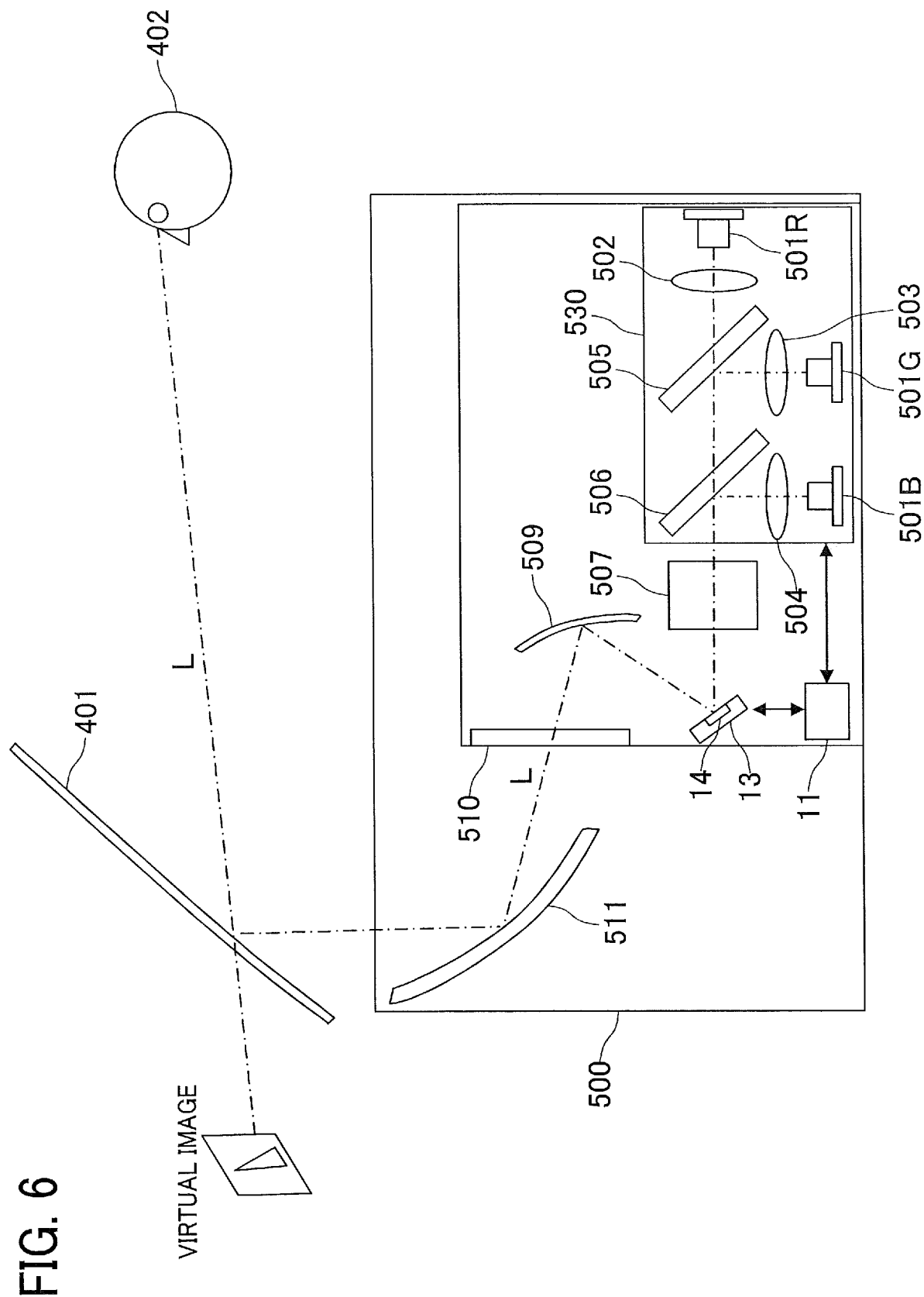
FIG. 6 is a schematic view of an example of the HUD.

As illustrated in FIG. 6, the heads-up display 500 emits laser beams from red, green, and blue laser-beam sources 501R, 501G, and 501B, respectively. The emitted laser beams pass through an incident optical system, and then are deflected by the movable device 13 including the reflecting surface 14. The incident optical system includes collimator lenses 502, 503, and 504 respectively provided for the laser-beam sources 501R, 501G, and 501B, two dichroic mirrors 505 and 506, and a light-intensity adjuster 507. The deflected laser beams pass through a projection optical system, and are projected onto a screen. The projection optical system includes a free-form surface mirror 509, an intermediate screen 510, and a projection mirror 511. In the HUD 500, the laser-beam sources 501R, 501G, and 501B, the collimator lenses 502, 503, and 504, and the dichroic mirrors 505 and 506 are combined as a single unit, that is, a light source unit 530 in an optical housing.

The HUD 500 projects an intermediate image displayed on the intermediate screen 510 onto the windshield 401 of the vehicle 400 to allow the driver 402 to visually recognize the intermediate image as a virtual image.

The laser beams of RGB colors emitted from the laser-beam sources 501R, 501G, and 501B are collimated by the collimator lenses 502, 503, and 504 into approximately parallel beams, and are combined by the two dichroic mirrors 505 and 506. The light intensity of the combined laser beams is adjusted by the light-intensity adjuster 507, and then two-dimensional scanning is performed by the movable device 13 provided with the reflecting surface 14. The projection light L used for two-dimensional scanning by the movable device 13 is reflected by the free-form surface mirror 509 so as to correct the distortion, and then is collected and focused onto the intermediate screen 510. Accordingly, an intermediate image is displayed. The intermediate screen 510 includes a microlens array in which a plurality of microlenses are two-dimensionally arranged, and enlarges the projection light L incident on the intermediate screen 510 in units of microlens.

The movable device 13 moves the reflecting surface 14 biaxially in a reciprocating manner to perform two-dimensional scanning with the projection light L incident on the reflecting surface 14. The driving of the movable device 13 is controlled in synchronization with the light-emitting timing of the laser-beam sources 501R, 501G, and 501B.

In the above description, the heads-up display 500 is described as an example of the image projection apparatus. However, no limitation is indicated thereby, and the image projection apparatus may be any apparatus that performs optical scanning, using the movable device 13 provided with the reflecting surface 14, to project an image. For example, the present disclosure is also applicable to a projector that is placed on a desk or the like and projects an image on a display screen, a head-mounted display device that is incorporated in a wearable member on the head of the observer, for example, and that projects an image on a reflective-and-transmissive screen of the wearable member or on an eyeball as a screen, and the like.

The image projection apparatus may be incorporated in, not only a vehicle or the wearable member, but also, for example, a mobile object such as an aircraft, a ship, or a moving robot, and an immobile object such as an operation robot that operates a driving target such as a manipulator without moving from the installed location.

Figure 7:
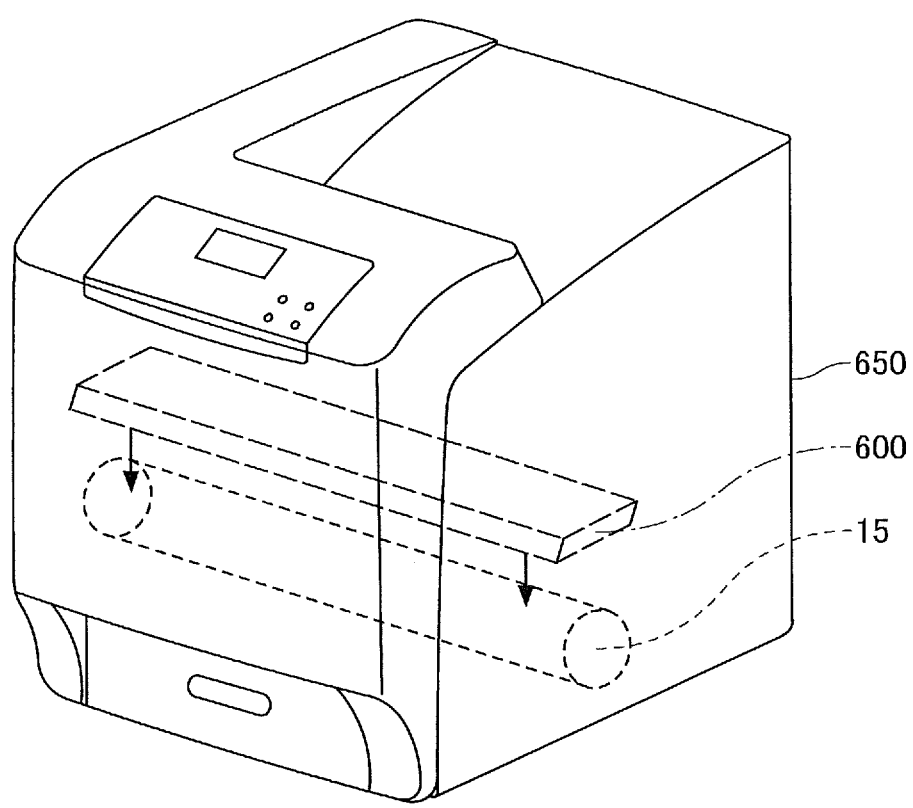
FIG. 7 is a schematic view of an example of an image forming apparatus equipped with an optical writing device.
Figure 8:
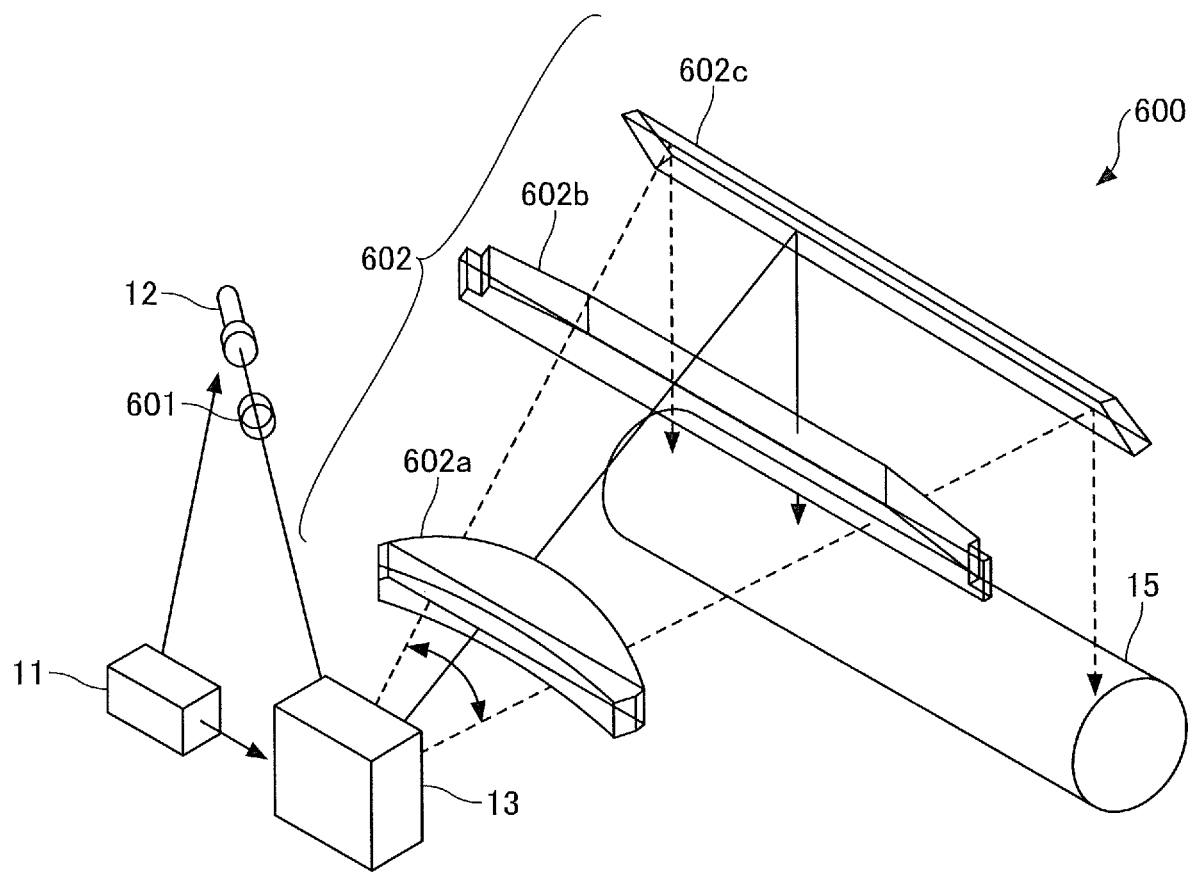
FIG. 8 is a schematic view of an example of the optical writing device.

Next, an optical writing device to which the movable device 13 according to the embodiment is applied is described in detail referring to FIGS. 7 and 8.

FIG. 7 is an illustration of an example of an image forming apparatus equipped with an optical writing device 600. FIG. 8 is a schematic view of an example of the optical writing device 600.

As illustrated in FIG. 7, the optical writing device 600 is used as a component of an image forming apparatus typified by a laser printer 650, for example, having printer functions using laser beams. In the image forming apparatus, the optical writing device 600 performs optical scanning on a photoconductor drum, which is the target surface 15, by using one or more laser beams, thereby performing optical writing on the photoconductor drum.

As illustrated in FIG. 8, in the optical writing device 600, a laser beam from the light-source device 12 such as a laser element passes through an image forming optical system 601 such as a collimator lens and is then deflected uniaxially or biaxially by the movable device 13 having the reflecting surface 14. The laser beam deflected by the movable device 13 passes through a scanning optical system 602 constituted by a first lens 602a, a second lens 602b, and a reflecting mirror unit 602c, and is emitted onto the target surface 15 (e.g., a photoconductor drum or photosensitive paper), and thereby optical writing is performed. The scanning optical system 602 forms a laser beam in the form of a spot on the target surface 15. The light-source device 12 and the movable device 13 including the reflecting surface 14 are driven based on the control of the control device 11.

As described above, the optical writing device 600 can be used as a component of the image forming apparatus having a printer function using laser beams. Moreover, by employing another scanning optical system to perform scanning in a biaxial manner in addition to the uniaxial manner, the optical writing device 600 can also be used as a component of an image forming apparatus such as a laser label apparatus that deflects laser beams to perform optical scanning on thermal media and print letters by heating.

The movable device 13 including the reflecting surface 14 to be applied to the optical writing device is advantageous in saving power of the optical writing device because power consumption for driving the movable device 13 is less than that for driving a rotational polygon mirror or the like. The movable device 13 makes a smaller wind noise when the reflector base oscillates compared with a rotational polygon mirror, and thus is advantageous in achieving low noise of the optical writing device. The optical writing device requires much smaller installation space than the installation space of a rotational polygon mirror, and the amount of heat generated by the movable device 13 is small. Accordingly, downsizing is easily achieved, and thus the optical writing device is advantageous in downsizing the image forming apparatus.

Next, an object recognition device to which the movable device 13 according to an embodiment of the present disclosure is applied is described in detail with reference to FIGS. 9 and 10.

Figure 9:
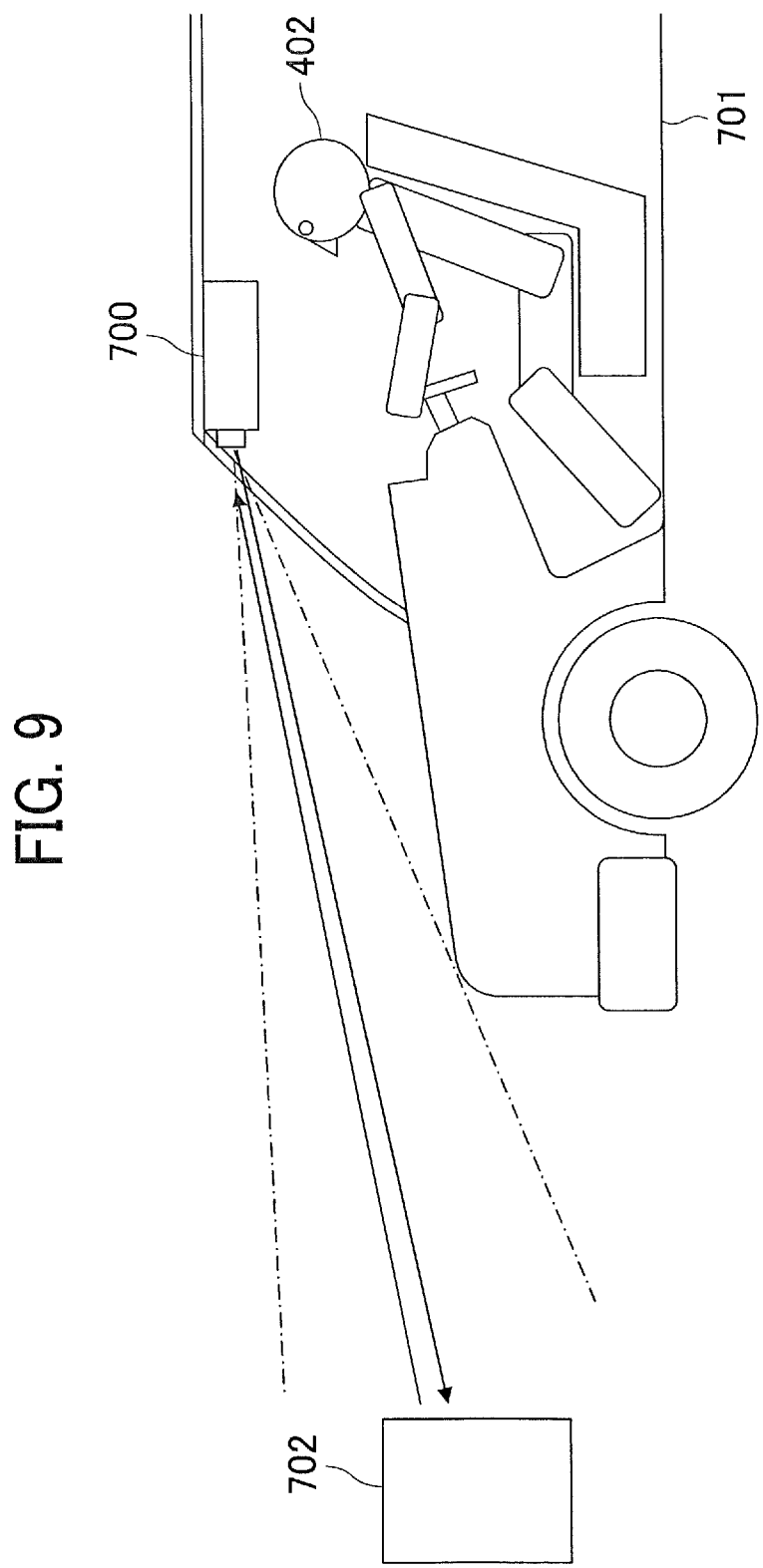
FIG. 9 is a schematic view of a motor vehicle mounted with a light detection and ranging (LiDAR) device.

FIG. 9 is a schematic diagram illustrating a vehicle provided with a LiDAR device that serves as an object recognition device, according to the present embodiment. FIG. 10 is a schematic view of an example of the LiDAR device.

The object recognition device is an apparatus that recognizes an object in a target direction, and is, for example, a LiDAR device.

As illustrated in FIG. 9, for example, a LiDAR device 700 is mounted on a vehicle 701 to perform optical scanning in a target direction and receive the light reflected from an object 702 that exists in the target direction. Accordingly, the object 702 can be recognized by the LiDAR device 700.

Figure 10:
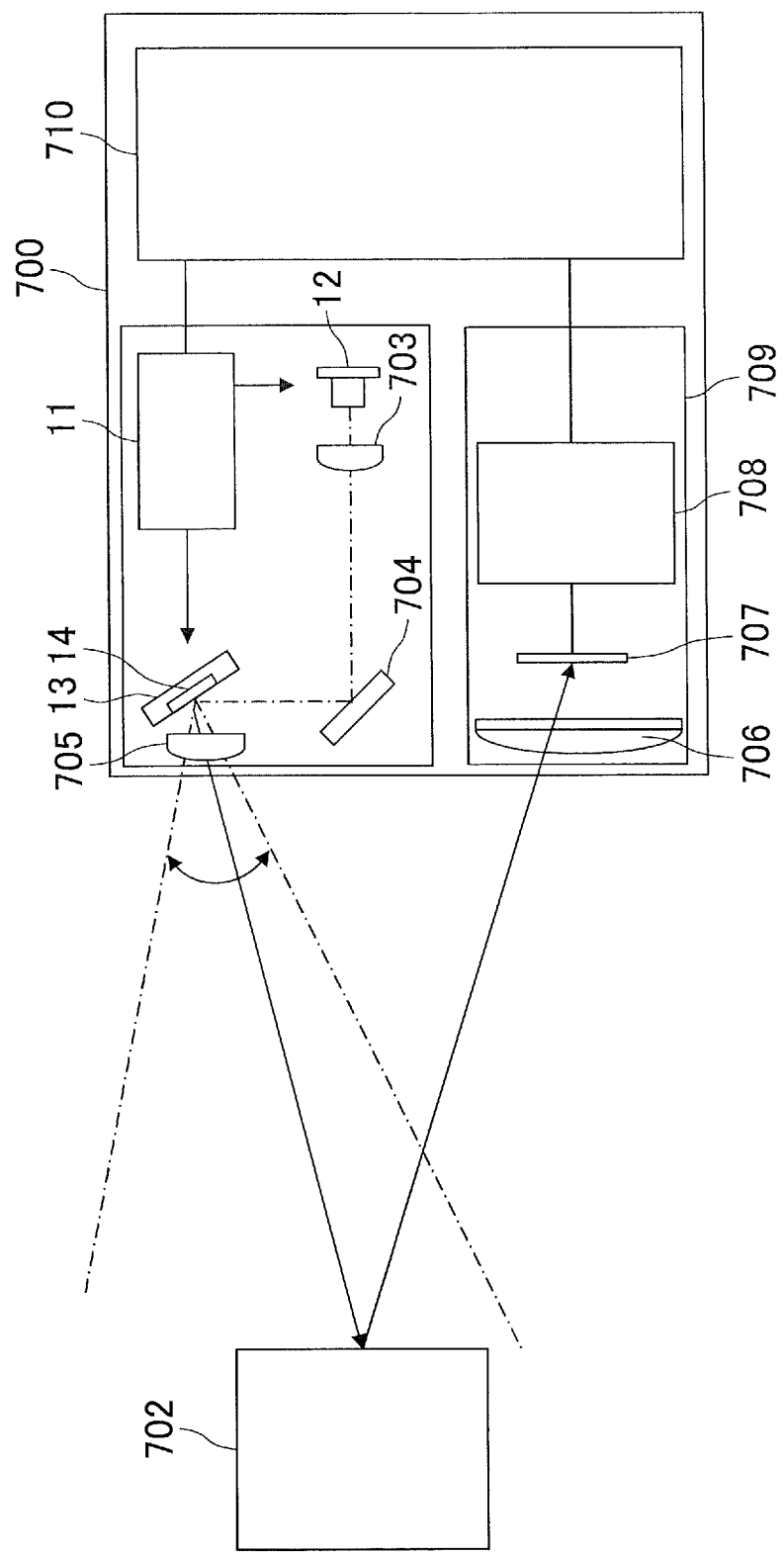
FIG. 10 is a schematic view of an example of the LiDAR device.

As illustrated in FIG. 10, the laser beams emitted from a light-source device 12 pass through an incident optical system, and then are caused to perform scanning uniaxially or biaxially using the movable device 13 including the reflecting surface 14. The incidence optical system includes a collimator lens 703 that serves as an optical system that collimates divergent beams into approximately parallel beams, and a planar mirror 704. The parallel beams are emitted to the object 702 ahead of the device, as passing through, for example, a projection lens 705 that serves as a projection optical system. The driving of the light-source device 12 and the movable device 13 is controlled by the control device 11. The light that is reflected by the object 702 is detected by a photodetector 709. More specifically, the reflected light passes through, for example, a condenser lens 706 that serves as an incident-light receiving and detecting optical system, and is received by an image sensor 707. Then, the image sensor 707 outputs a detected signal to a signal processing device 708. The signal processing device 708 performs predetermined processing on the input detected signal, such as binarization or noise processing, and outputs the result to a distance measuring circuit 710.

The distance measuring circuit 710 determines whether the object 702 is present based on the time difference between the timing at which the light-source device 12 emits laser beams and the timing at which the photodetector 709 receives the laser beams or the phase difference per pixel of the image sensor 707 that have received the laser beams. Moreover, the distance measuring circuit 710 calculates distance information indicating the distance from the object 702.

The movable device 13 including the reflecting surface 14 is less likely broken and is compact compared with a polygon mirror, and thus, a highly durable and compact LiDAR device can be provided. Such a LiDAR device is attached to, for example, a vehicle, an aircraft, a ship, a robot, or the like, and can perform optical scanning within a predetermined range to determine whether an obstacle is present or to recognize the distance to the obstacle.

In the present embodiment, the LiDAR device 700 is described as an example of the object recognition device. However, no limitation is intended thereby. The object recognition device may be any apparatus that performs optical scanning by controlling the movable device 13 provided with the reflecting surface 14, using the control device 11, and that receives the receives the reflected laser beam using a photodetector to recognize the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object based on the distance information, and refers to records to recognize the object. The security sensor performs optical scanning in a target range to recognize an incoming object. The three-dimensional scanner performs optical scanning to obtain distance information, calculates object information such as the shape of the object based on the distance information to recognize the object, and outputs the object information in the form of three-dimensional data.

Figure 11:
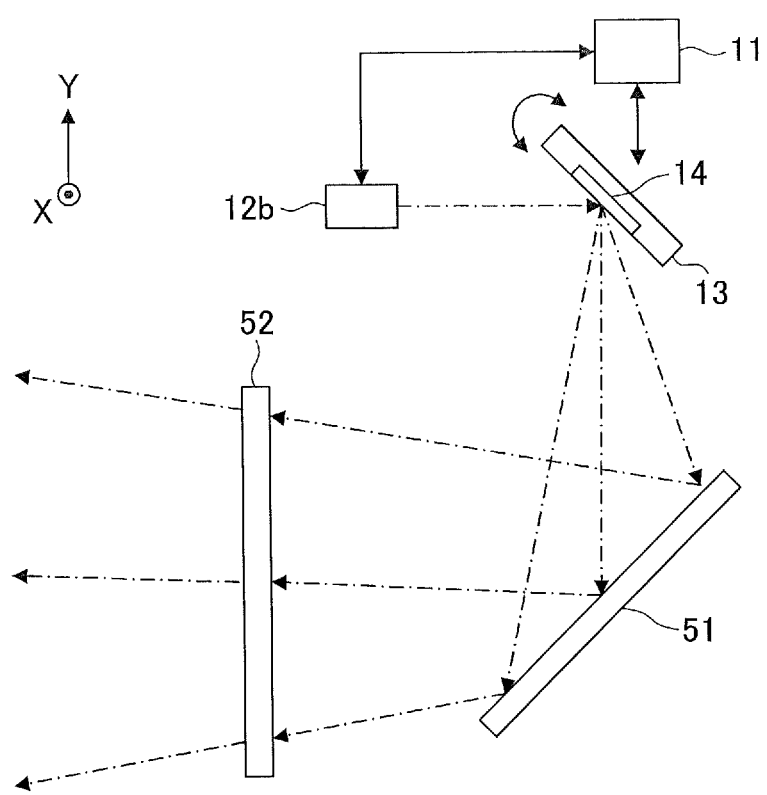
FIG. 11 is a schematic view of an example of a configuration of a laser headlamp.

Next, a laser headlamp 50 in which the movable device according to the present embodiment is applied to a headlight of a car is described with reference to FIG. 11. FIG. 11 is a schematic view of an example of a configuration of the laser headlamp 50.

The laser headlamp 50 includes a control device 11, a light-source device 12b, a movable device 13 including a reflecting surface 14, a mirror 51, and a transparent plate 52.

The light-source device 12b is a light source that emits a blue laser beam. The laser beam emitted from the light-source device 12b is incident on the movable device 13 and is reflected by the reflecting surface 14. The movable device 13 moves the reflecting surface 14 in the XY-direction based on the signal from the control device 11, and performs two-dimensional scanning using the blue laser beam emitted from the light-source device 12b in the XY-direction.

The scanning light of the movable device 13 is reflected by the mirror 51, and is incident on the transparent plate 52. The transparent plate 52 is coated with a yellow phosphor on the front surface or the back surface. The blue laser beams that are reflected by the mirror 51 are converted into white light whose color is within the range of the statutory color for a headlight as passing through the yellow phosphor (fluorescent material) of the transparent plate 52. Accordingly, the front of the vehicle is illuminated with white light from the transparent plate 52.

The scanning light of the movable device 13 scatters in a predetermined manner as passing through the fluorescent material of the transparent plate 52. Accordingly, glare is attenuated at an illuminated target in the area ahead of the automobile.

When the movable device 13 is applied to a headlight of a vehicle, the color of light beams from the light-source device 12b and the color of the phosphor are not limited to blue and yellow, respectively. For example, the light-source device 12b may emit near-ultraviolet light, and the transparent plate 52 may be coated with homogenized mixture of a plurality of kinds of fluorescent materials of red-green-blue (RGB) trichromatic colors. In this case as well, the light passing through the transparent plate 52 can be converted into white light, and the front of the vehicle can be illuminated with white light.

Figure 12:
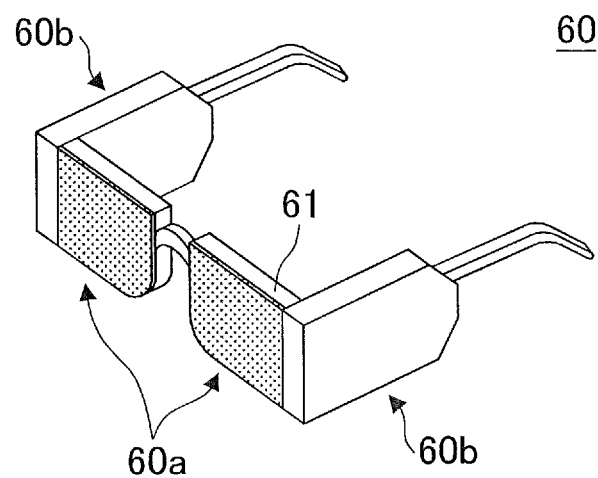
FIG. 12 is a schematic perspective view of an example of a external appearance of a head-mounted display (HMD)
Figure 13:
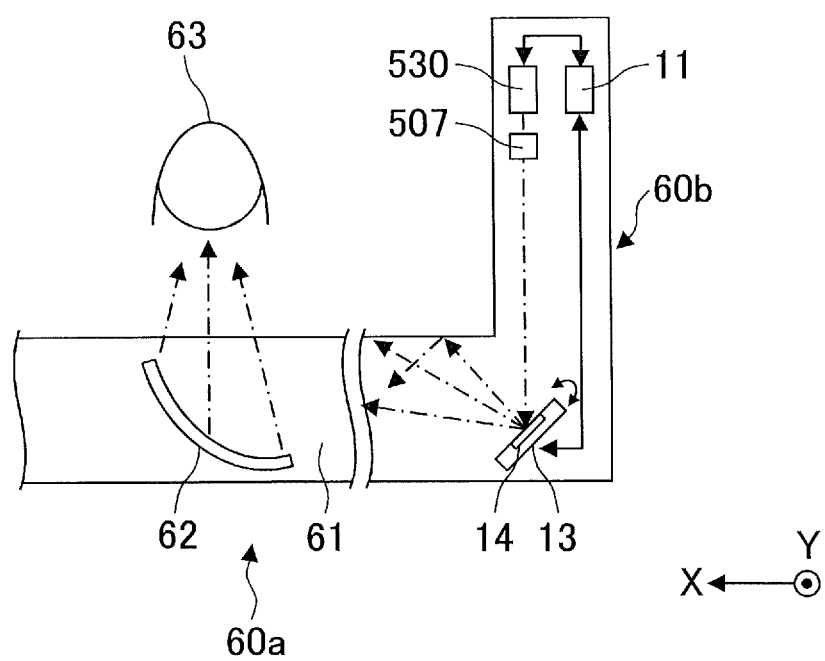
FIG. 13 is an illustration of a part of an example configuration of the HMD.

Next, a head-mounted display (MD) 60 to which the movable device 13 according to the embodiment is applied is described referring to FIGS. 12 and 13. Note that the HMD 60 is a head-mounted display that can be mounted on a human head, and can be shaped like, for example, glasses. In the following description, such a head-mounted display may be referred to simply as an HMD.

FIG. 12 is a perspective view of the appearance of the MID 60. In FIG. 12, the HMD 60 includes a pair of a front 60a and a temple 60b on each of the left and right, which are approximately symmetrically arranged. The front 60a can include, for example, a light guide plate 61. An optical system, a control device, and the like, can be incorporated in the temple 60b.

FIG. 13 illustrates a partial configuration of the HMD 60. In FIG. 13, a configuration or structure for the left eye is illustrated, but the HMD 60 may have a similar configuration or structure on the other side for the right eye.

The HMD 60 includes a control device 11, a light source unit 530, a light-intensity adjuster 507, a movable device 13 including a reflecting surface 14, a light guide plate 61, and a half mirror 62.

The light source unit 530 includes, as described above, the laser-beam sources 501R, 501G, and 501B, the collimator lenses 502, 503, and 504, and the dichroic mirrors 505 and 506, and these elements are combined as a single unit in the optical housing. In the light source unit 530, the laser beams of the RGB colors that are emitted from the laser-beam sources 501R, 501G, and 501B are combined by the two dichroic mirrors 505 and 506. The combined parallel light is emitted from the light source unit 530.

The light intensity of the combined laser beams from the light source unit 530 is adjusted by the light-intensity adjuster 507, and then the light is incident on the movable device 13. The movable device 13 moves the reflecting surface 14 in the XY-direction based on the signal from the control device 11, and performs two-dimensional scanning with the light emitted from the light source unit 530. The driving of the movable device 13 is controlled in synchronization with the light emission timings of the laser-beam sources 501R, 501G, and 501B, and a color image is formed with the scanning light.

The scanning light of the movable device 13 is incident on the light guide plate 61. The light guide plate 61 guides the scanning light to the half mirror 62 while reflecting the scanning light on the inner wall surface. The light guide plate 61 is formed of a material such as a resin having transparency at the wavelength of the scanning light.

The half mirror 62 reflects the light from the light guide plate 61 to the back side of the HMD 60, and emits the light in the direction of the eyes of a wearer 63 of the HMD 60. The half mirror 62 has, for example, a free-form surface shape. The image of the scanning light is reflected by the half mirror 62, and then is formed on the retina of the wearer 63. The image of the scanning light is formed on the retina of the wearer 63 due to the reflection at the half mirror 62 and the effect of the crystalline lenses of eyeballs. Moreover, due to the reflection at the half mirror 62, the spatial distortion of the image is corrected. The wearer 63 can observe an image formed by the light of scanning in the XY direction.

The wearer 63 observes an image of external light superposed on the image of the scanning light because of the half mirror 62. Alternatively, a mirror may be provided instead of the half mirror 62 so that external light is blocked out and the wearer 63 observes only the image of the scanning light.

Figure 14:
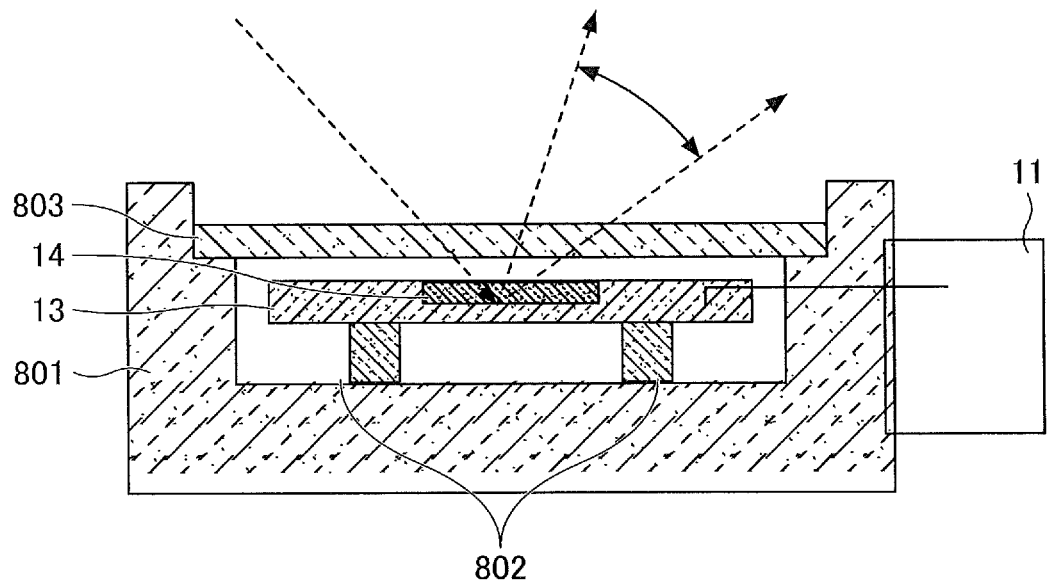
FIG. 14 is a schematic view of an example of a packaged movable device.

Next, packaging of the movable device 13 according to the embodiment is described referring to FIG. 14.

FIG. 14 is a schematic view of an example of a packaged movable device 13.

As illustrated in FIG. 14, the movable device 13 is mounted on a mounting member 802 inside a package member. The package member 801 is partly covered with and sealed by a transmissive member 803 so that the movable device 13 is packaged. The package contains inert gas such as nitrogen and is sealed. This configuration can substantially prevent the deterioration of the movable device 13 due to oxidation, and increase the durability against changes in environment such as temperature.

The following describes details of the movable device of the embodiments of the present disclosure used for the light scanning system, the HUD, the optical writing device, the object recognition device, the laser headlamp, and the HMD described above with reference to the drawings.

Figure 15:
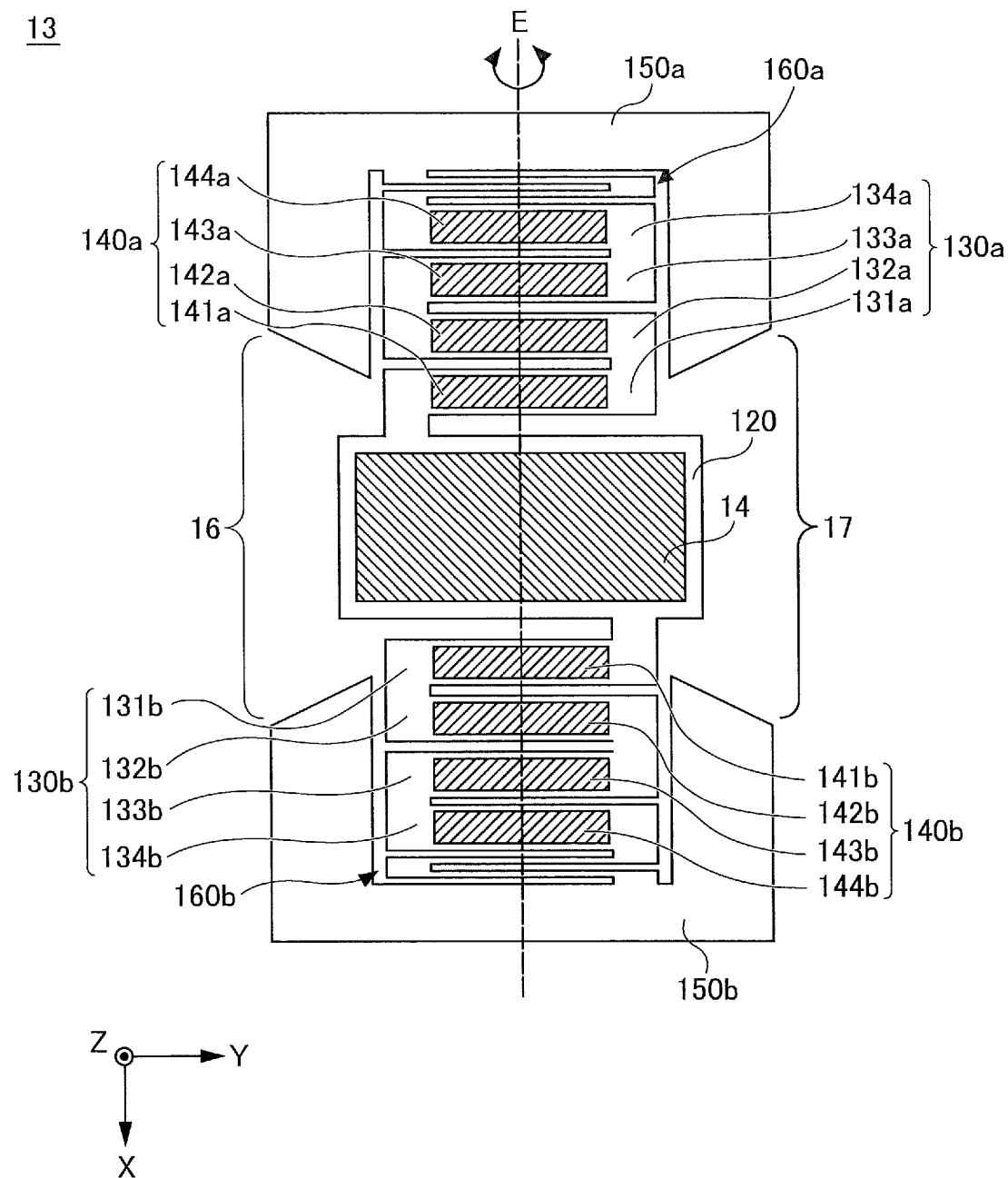
FIG. 15 is a plan view of a movable device according to a first embodiment of the present disclosure.

The configuration of the movable device (a light deflector) according to a first embodiment of the present disclosure is described below with reference to FIG. 15. FIG. 15 is a plan view of a movable device that is doubly supported and can uniaxially deflect light.

Hereinafter, the direction of the oscillation axis E of the reflector 120 is an X direction, and a direction orthogonal to the X direction is a Y direction, and a direction orthogonal to the X direction and the Y direction is a Z direction.

As illustrated in FIG. 15, the movable device 13 includes a reflector 120, movable parts 130a and 130b, drive circuits 140a and 140b, supporting units 150a and 150b, and springs 160a and 160b. In the present embodiment, the reflector 120 has a rectangular shape and has a reflecting surface 14 of a rectangular shape on the reflector 120 to reflect incident light. The shape of the reflector 120 is not limited to the rectangular shape, and may be any shape other than the rectangular shape.

The movable parts 130a and 130b are coupled to the reflector 120. The movable parts 130a and 130b are opposed to each other with the reflector 120 between the movable parts 130a and 130b and support the reflector 120 to be swingable.

The drive circuits 140a and 140b elastically deform the movable parts 130a and 130b, and thus the reflector 120 swings (rotates oscillates) around the oscillation axis E parallel to the X direction. The drive circuits 140a and 140b are formed on the movable parts 130a and 130b, respectively.

The supporting units 150a and 150b are provided with opening portions (openings) 16 and 17 in part. Accordingly, the supporting units 150a and 150b are separate from each other with the opening portions 16 and 17 between the supporting units 150a and 150b. The open portions 16 and 17 are located in a direction (±Y direction) orthogonal to the oscillation axis E with respect to the reflector 120 and serve as a light transmissive portion to transmit light reflected by the reflecting surface 14 when the reflector 120 oscillates.

In the present embodiment, the open portions 16 and 17 are formed in a tapered shape that the width of each opening portion along the oscillation axis E increases in a direction away from the oscillation axis E. By forming the opening portions 16 and 17 in such a tapered shape, the opening portions 16 and 17 transmit the reflected light having an angle of divergence without intercepting that reflected light.

The supporting unit 150a is coupled to the movable part 130a via the spring 160a. The supporting unit 150b is coupled to the movable part 130b via the spring 160b.

The wiring that transmits, to the drive circuits 140a and 140b, a drive voltage applied to the electrode terminal provided on the supporting units 150a and 150b is provided in a region on the movable parts 130a and 130b other than the drive circuits 140a and 140b and on the supporting units 150a and 150b.

Four movable beams 131a to 134a arranged in parallel constitute the movable part 130a. Each of the movable beams 131a to 134a is a rectangular member whose longitudinal direction is the Y direction, and adjacent ends of the movable beams 131a to 134a are coupled to each other to constitute a bending structure (a meandering structure). The movable beam 131a located on the reflector 120 side of the movable part 130a is coupled to the reflector 120. The movable beam 134a located on the spring 160a side of the movable part 130a is coupled to the spring 160a.

Four movable beams 131b to 134b constitute the movable part 130b. Each of the movable beams 131b to 134b is a rectangular member whose longitudinal direction is the Y direction, and adjacent ends of the movable beams 131b to 134b are coupled to each other to constitute a bending structure (a meandering structure). A movable beam 131b located on the reflector 120 side of the movable part 130b is coupled to the reflector 120. A movable beam 134b, which is located on the spring 160b side of the movable part 130b, is coupled to the spring 160b.

The drive circuit 140a includes four piezoelectric elements 141a to 144a. Each of the piezoelectric elements 141a to 144a has a rectangular shape whose longitudinal direction is the Y direction, and the piezoelectric elements 141a to 144a are formed on the movable beams 131a to 134a, respectively.

The drive circuit 140b includes four piezoelectric elements 141b to 144b. Each of the piezoelectric elements 141b to 144b has a rectangular shape whose longitudinal direction is the Y direction, and the piezoelectric elements 141b to 144b are formed on the movable beams 131b to 134b, respectively.

The spring 160a is a meandering spring of a bending structure (a meandering structure) such that the Y direction is the longitudinal direction and the X direction is the width direction of the spring 160a. The spring 160a has one end coupled to the movable part 130a and the other end coupled to the supporting unit 150a. In the present embodiment, the longitudinal direction of the spring 160a is the same as the longitudinal direction of the movable beams 131a to 134a.

The spring 160b is a meandering spring of a bending structure (a meandering structure) such that the Y direction is the longitudinal direction and the X direction is the width direction of the spring 160b. The spring 160b has one end coupled to the movable part 130b and the other end coupled to the supporting unit 150b. In the present embodiment, the longitudinal direction of the spring 160b is the same as the longitudinal direction of the movable beams 131b to 134b.

The spring 160a is less rigid in the oscillation direction of the reflector 120 and more rigid in the direction perpendicular to the reflecting surface 14, i.e., in the Z direction, than the movable part 130a. Same as the spring 160a, the spring 160b is also less rigid in the direction of the oscillation axis E and more rigid in a direction (the Z direction) perpendicular to the reflecting surface 14 than the movable part 130b.

Figure 16:
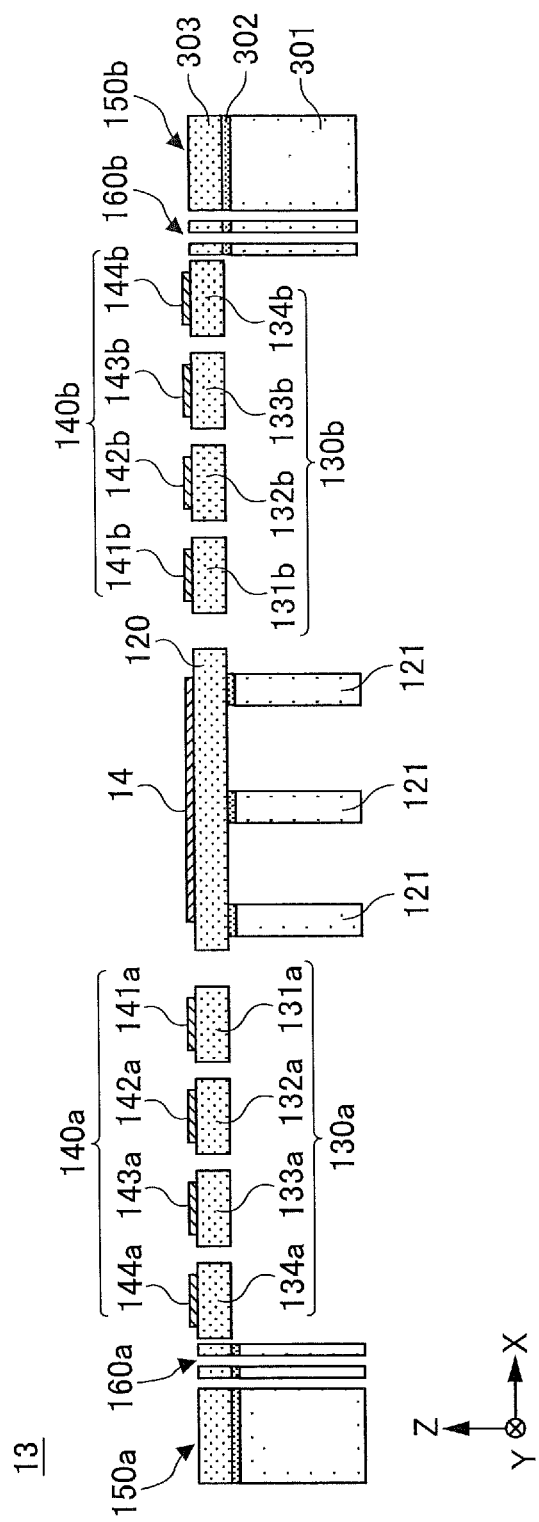
FIG. 16 is a cross-sectional view taken along line an oscillation axis E in FIG. 15.

FIG. 16 is a cross-sectional view taken along the oscillation axis E in FIG. 15. The movable device 13 is manufactured by forming the reflecting surface 14 and the drive circuits 140a and 140b on one silicon on insulator (SOI) substrate processed by, for example, etching.

The SOI substrate is a substrate that includes a silicon support layer 301 formed of single crystal silicon-(Si), an oxidized silicon layer 302 formed on the silicon support layer 301, and a silicon active layer 303 formed of single-crystal silicon on the oxidized silicon layer 302. The oxidized silicon layer 302 is referred to also as a buried oxide (BOX) layer.

The silicon active layer 303 has a smaller thickness in the Z direction than the thickness in the X direction and the Y direction. For this reason, the silicon support layer 301 and the oxidized silicon layer 302 are removed by etching from the SOI substrate, and thus created is formed only of the silicon active layer 303 and has a lower rigidity in the Z direction.

The supporting units 150a and 150b includes the silicon supporting layer 301, the oxidized silicon layer 302, the silicon active layer 303, and the like and have a high rigidity.

The reflector 120 is formed of the silicon active layer 303. The reflecting surface 14, which is the surface of the reflector 120, is formed by forming a thin layer that contains, for example, aluminum (Al), gold (Au), and silver (Ag), or a derivative multilayer film on the surface of the reflector 120. Reinforcing ribs 121 are formed on the other surface of the reflector 120, i.e., on the opposite surface of the surface on which the reflecting surface 14 is disposed. Each rib 121 is formed by patterning the silicon supporting layer 301 and the oxidized silicon layer 302 through the etching process. The ribs 121 operate to substantially prevent the distortion of the reflecting surface 14.

The movable parts 130a and 130b are formed by patterning the silicon active layer 303 through the etching process. Since the movable parts 130a and 130b are formed only of the silicon active layer 303, the movable parts 130a and 130b have a low rigidity and an elasticity.

Each of the piezoelectric elements 141a to 144a and 141b to 144b is formed by laminating a lower electrode, a piezoelectric circuit, and an upper electrode. Each of the upper electrode and the lower electrode is made of, for example, gold (Au) or platinum (Pt). For example, the piezoelectric circuit is made of lead zirconate titanate (PZT), which is a piezoelectric material. When a positive or negative voltage is applied in a polarizing direction, in proportion to the potential of the applied voltage, the piezoelectric circuit is deformed (for example, expansion and contraction) and exerts a so-called inverse piezoelectric effect.

The movable parts 130a and 130b are elastically deformed by the deformation of the piezoelectric elements 141a to 144a and 141b to 144b.

The springs 160a and 160b are formed by patterning the silicon supporting layer 301, the oxidized silicon layer 302, and the silicon active layer 303 through the etching. The springs 160a and 160b have a bending structure that has a small width in the X direction and extends in the Y direction. Accordingly, the springs 160a and 160b have a low rigidity in the direction of the oscillation axis E (the X direction). However, the springs 160a and 160b have a high rigidity in the Z direction because the springs 160a and 160b are of a three-layer structure including the silicon supporting layer 301, the oxidized silicon layer 302, and the silicon active layer 303.

The movable device 13 configured as described above operates by applying a drive voltage from the electrode terminals to the drive circuits 140a and 140b. The drive voltage has, for example, a sinusoidal waveform, and the frequency is, for example, 600 hertz (Hz).

Specifically, among the piezoelectric elements 141a to 144a and 141b to 144b, the piezoelectric elements 141a, 143a, 142b and 144b are the first piezoelectric element group, and the piezoelectric elements 142a, 144a, 141b and 143b are the second piezoelectric element group, the drive voltage whose voltage level is inverted between the first piezoelectric element group and the second piezoelectric element is applied to the first piezoelectric element group and the second piezoelectric element group. Accordingly, the drive circuits 140a and 140b expand and contract by themselves to cause the movable beams 131a, 133a, 132b, and 134b and the movable beams 132a, 134a, 131b, and 133b to periodically deform in opposite directions. As a result, the reflector 120 oscillates around the oscillation axis E.

In the movable device 13, since the supporting units 150a and 150b are separated by the opening portions 16 and 17, the light reflected by the reflector 120 passes through the opening portions 16 and 17 when the deflection angle of the reflector 120 is large. This configuration prevents the reflected light from being blocked by the supporting units 150a and 150b.

However, due to the structure that the supporting units 150a and 150b are separated by the opening portions 16 and 17, the spacing between the supporting units 150a and 150b (the size of the opening portions 16 and 17) might change during the packaging of the movable device 13, during the mounting of the movable device 13 on the circuit board, or with temperature changes. With such a change in the spacing between the supporting units 150a and 150b, the movable parts 130a and 130b might be distorted, and the spring constant of the movable parts 130a and 130b might fluctuate. If the spring constant of the movable parts 130a and 130b fluctuates, the resonance frequency, which is a main property of the movable device 13 as the light deflector, might significantly fluctuate from the design value.

In the present embodiment, since the movable parts 130a and 130b are coupled to the supporting units 150a and 150b via the springs 160a and 160b, the springs 160a and 160b deform earlier than the movable parts 130a and 130b do, irrespective of the change in the spacing between the supporting units 150a and 150b. This configuration substantially prevents the distortion of the movable parts 130a and 130b, which further prevents the fluctuations in the resonance frequency.

If the thickness of the springs 160a and 160b is equal to or less than the thickness of the movable parts 130a and 130b, the springs 160a and 160b are bent when the reflector 120 oscillates. Accordingly, the resonance frequency and oscillation mode defined by the structure of the movable parts 130a and 130b might change. However, in the present embodiment, the springs 160a and 160b are thicker and more rigid than the movable parts 130a and 130b. This configuration prevents the bending of the springs 160a and 160b when the reflector 120 oscillates, and accordingly the fluctuations in the resonance frequency and the oscillation mode are substantially prevented.

In the above-described embodiments, the light deflector adopts the piezoelectric system that obtains the driving force using the piezoelectric element. However, the light deflector may employ any desired drive system.

The movable device (light deflector) according to another embodiment is described below. Like reference signs are applied to identical or corresponding components throughout the drawings and redundant description thereof be omitted.

Figure 17:
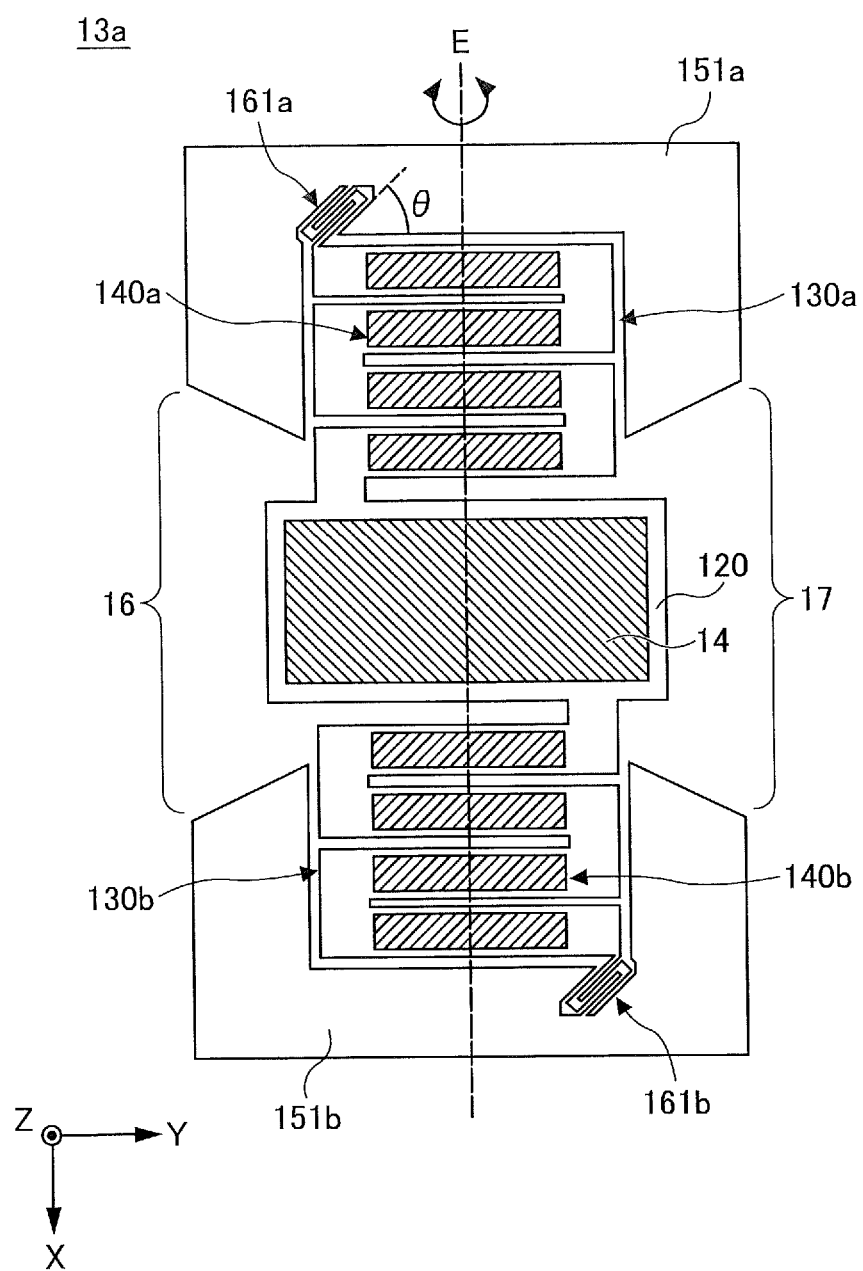
FIG. 17 is a plan view of a movable device according to a second embodiment of the present disclosure.

FIG. 17 is a plan view of a movable device according to a second embodiment of the present disclosure. As illustrated in FIG. 17, the movable device 13a according to the present embodiment differs from the first embodiment in the structure of the springs 161a and 161b.

Similarly to the first embodiment, the supporting units 151a and 151b according to the second embodiment are provided with the opening portions 16 and 17 at a part of the frame member of the supporting units 151a and 151b, which makes the supporting units 151a and 151b separate from each other with the opening portions 16 and 17 between the supporting units 151a and 151b.

Further, similarly to the first embodiment, the springs 161a and 161b according to the second embodiment are meandering springs of the bending structure (the meandering structure). Unlike the first embodiment, in the present embodiment, the longitudinal direction of the springs 161*a* and 161*b* is not the same as the longitudinal direction of the movable beams 131*b* to 134*b*. An angle θ formed by the longitudinal direction of the springs 161*a* and 161*b* and the longitudinal direction (the Y direction) of the movable beams 131*b* to 134*b* is within the range that is greater than 0° and less than 900 (0°<θ<90°). In this embodiment, θ is equal to 45° (θ=45°).

The spring 161*a* has one end coupled to the movable part 130*a* and the other end coupled to the supporting unit 151*a*. The spring 161*b* has one end coupled to the movable part 130*b* and the other end coupled to the supporting unit 151*b*. In the present embodiment, the springs 161*a* and 161*b* are arranged to be substantially 180-degree rotationally symmetrical with reference to the center of the reflector 120 in the XY plane. With such an arrangement of the springs 161*a* and 161*b*, the spring constants of the springs 161*a* and 161*b* in the respective directions become symmetric with respect to the oscillation axis E. This gives stability to the oscillation mode.

Similarly to the first embodiment, the springs 161*a* and 161*b* are more rigid in the direction of the oscillation axis E than the movable parts 130*a* and 130*b*. Further, the springs 161*a* and 161*b* are thicker and more rigid than the movable parts 130*a* and 130*b*.

The other elements of the movable device 13*a* according to the present embodiment have the same configurations as in the movable device 13 according to the first embodiment.

As described above, the angle θ formed by the longitudinal direction of the springs 161*a* and 161*b* and the longitudinal direction of the movable beams 131*b* to 134*b* is within the range that is greater than 0° and less than 90° (0°<θ<90°). Accordingly, even if the supporting units 151*a* and 151*b* are misaligned in two directions, the direction of the oscillation axis E (the X direction) and the direction orthogonal to the oscillation axis E (the Y direction) during the packaging of the movable device 13*a*, during the mounting of the movable device 13*a* on the circuit board, or with temperature changes, the distortion of the movable parts 130*a* and 130*b* is substantially prevented and the fluctuation in the resonance frequency is also substantially prevented.

Figure 18:
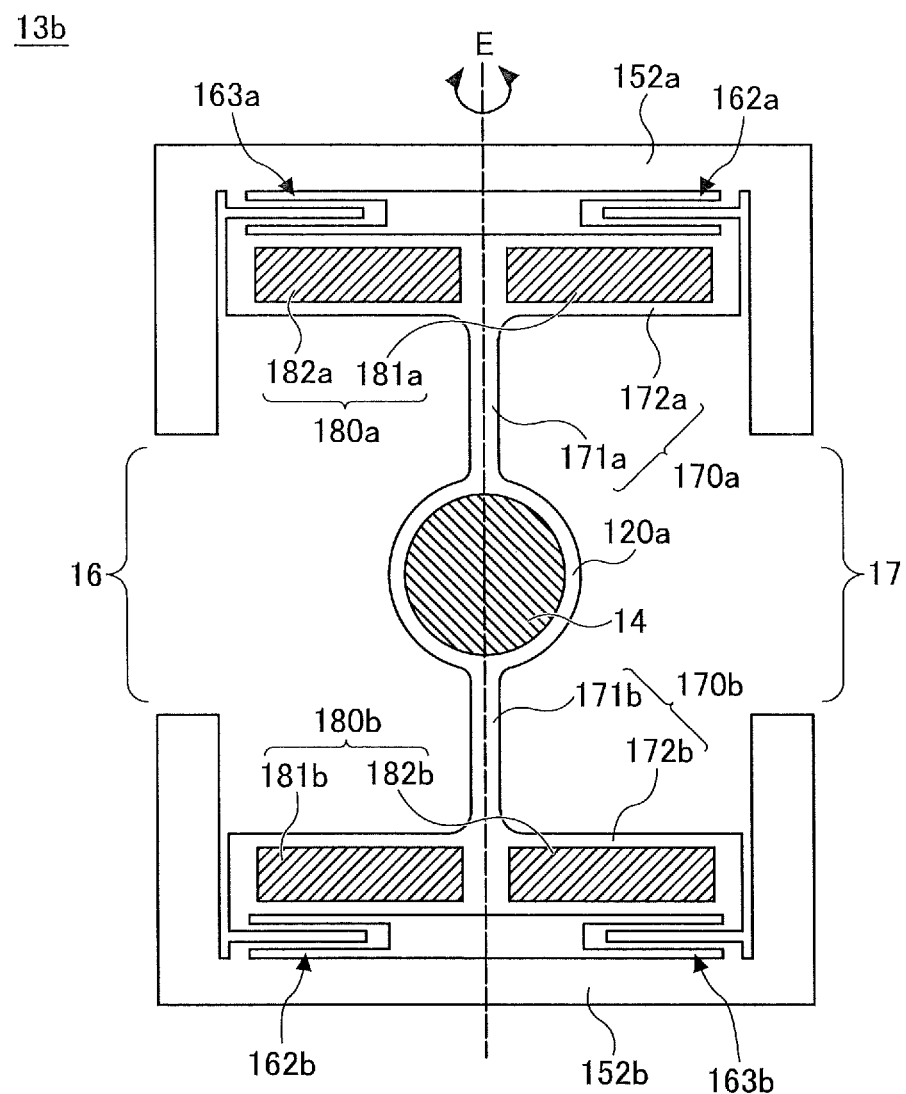
FIG. 18 is a plan view of a movable device according to a third embodiment of the present disclosure.

FIG. 18 is a plan view of a movable device according to a third embodiment of the present disclosure. As illustrated in FIG. 18, the movable device 13*b* includes a reflector 120*a*, movable parts 170*a* and 170*b*, drive circuits 180*a* and 180*b*, supporting units 152*a* and 152*b*, and springs 162*a*, 163*a*, 162*b*, and 163*b*.

Similarly to the first embodiment, the supporting units 152*a* and 152*b* according to the third embodiment are provided with the opening portions 16 and 17 at a part of the frame member of the supporting units 152*a* and 152*b*, which makes the supporting units 152*a* and 152*b* separate from each other with the opening portions 16 and 17 between the supporting units 152*a* and 152*b*.

In the present embodiment, the reflector 120*a* is circular and has a circular reflecting surface 14.

The movable part 170*a* includes a torsion bar 171*a* and a movable beam 172*a*. The movable beam 172*a* is a rectangular member whose longitudinal direction is the Y direction. The torsion bar 171*a* is a rod-shaped member extending in the direction of the oscillation axis E and has one end coupled to the reflector 120*a* and the other end coupled to the center of the movable beam 172*a* in the longitudinal direction of the movable beam 172*a*.

The movable portion 170*b* has a torsion bar 171*b* and a movable beam 172*b*. The movable beam 172*b* is a rectangular member whose longitudinal direction is the Y direction. The torsion bar 171*b* is a rod-shaped member extending in the direction of the oscillation axis E, and has one end coupled to the reflector 120*a* and the other end coupled to the center of the movable beam 172*b* in the longitudinal direction of the movable beam 172*b*.

The torsion bars 171*a* and 171*b* are opposed to each other with the reflector 120*a* between the torsion bars 171*a* and 171*b* and support the reflector 120*a* to be swingable.

The drive circuit 180*a* includes two piezoelectric elements 181*a* and 182*a*. The piezoelectric elements 181*a* and 182*a* have a rectangular shape whose longitudinal direction is the Y direction and are arranged symmetrically about the oscillation axis E on the movable beam 172*a*.

The drive circuit 180*b* includes two piezoelectric elements 181*b* and 182*b*. The piezoelectric elements 181*b* and 182*b* have a rectangular shape whose longitudinal direction is the Y direction and are arranged symmetrically about the oscillation axis E on the movable beam 172*b*.

Similarly to the first embodiment, each of the springs 162*a*, 163*a*, 162*b*, and 163*b* is a meandering spring of the bending structure (the meandering structure) such that the Y direction is the longitudinal direction and the X direction is the width direction of each of the springs 162*a*, 163*a*, 162*b*, and 163*b*.

Each of the springs 162*a* and 163*a* has one end coupled to the movable beam 172*a* and the other end coupled to the supporting unit 152*a*. The springs 162*a* and 163*a* are arranged symmetrically about the oscillation axis E. With such an arrangement of the springs 162*a* and 163*a*, the spring constants of the springs 162*a* and 163*a* in the respective directions become symmetric with respect to the oscillation axis E. This gives stability to the oscillation mode. The spring 162*a* is coupled to the +Y-side end of the movable beam 172*a* and is disposed close to the piezoelectric element 181*a*. The spring 163*a* is coupled to the −Y-side end of the movable beam 172*a* and is disposed close to the piezoelectric element 182*a*.

Each of the springs 162*b* and 163*b* has one end coupled to the movable beam 172*b* and the other end coupled to the supporting unit 152*b*. The springs 162*b* and 163*b* are arranged symmetrically about the oscillation axis E. The spring 162*b* is coupled to the −Y-side end of the movable beam 172*b* and is disposed close to the piezoelectric element 181*b*. The spring 163*b* is coupled to the +Y-side end of the movable beam 172*b* and is disposed close to the piezoelectric element 182*b*.

Similarly to the first embodiment, since the movable parts 170*a* and 170*b* are formed only of the silicon active layer 303, the movable parts 170*a* and 170*b* have a low rigidity and a sufficient elasticity to move the reflector 120*a*.

The springs 162*a*, 163*a*, 162*b*, and 163*b* are formed by patterning the silicon supporting layer 301, the oxidized silicon layer 302, and the silicon active layer 303 through the etching. The springs 162*a*, 163*a*, 162*b*, and 163*b* are also less rigid in the direction of the oscillation axis E and more rigid in a direction (the Z direction) perpendicular to the reflecting surface 14 than the movable parts 170*a* and 170*b*.

The movable device 13*b* configured as described above operates by applying a drive voltage from the electrode terminals to the drive circuits 180*a* and 180*b*. The drive voltage has, for example, a sinusoidal waveform.

Specifically, among the piezoelectric elements 181*a*, 182*a*, 181*b*, and 182*b*, the piezoelectric elements 181*a* and 182*b* are the first piezoelectric element group, and the piezoelectric elements 182*a* and 181*b* are the second piezoelectric element group, the drive voltage whose voltage level is inverted between the first piezoelectric element group and the second piezoelectric element is applied to the first piezoelectric element group and the second piezoelectric element group. Accordingly, the drive circuits 180*a* and 180*b* expand and contract by themselves to cause the torsion bars 171*a* and 171*b* to periodically deform in the same direction. As a result, the reflector 120 oscillates around the oscillation axis E.

In the present embodiment, since the movable parts 170*a* and 170*b* are coupled to the supporting units 152*a* and 152*b* via the springs 162*a*, 163*a*, 162*b*, and 163*b*, the distortion of the movable parts 170*a* and 170*b* due to the changes in the spacing between the supporting units 152*a* and 152*b* is substantially prevented. Accordingly, the fluctuations in the resonance frequency are substantially prevented. Further, the springs 162*a*, 163*a*, 162*b*, and 163*b* are thicker and more rigid than the movable parts 170*a* and 170*b*. This configuration prevents the bending of the springs 162*a*, 163*a*, 162*b*, and 163*b* when the reflector 120*a* oscillates, and accordingly the fluctuations in the resonance frequency and the oscillation mode are substantially prevented.

Further, since the springs 162*a*, 163*a*, 162*b*, and 163*b* are arranged symmetrically about the oscillation axis E, the oscillation mode of the reflector 120*a* is stabilized.

In the movable device 13*b* according to the third embodiment, one piezoelectric element is provided with one spring. However, no limitation is intended thereby, and any desired number of springs may be used in one piezoelectric element.

Figure 19:
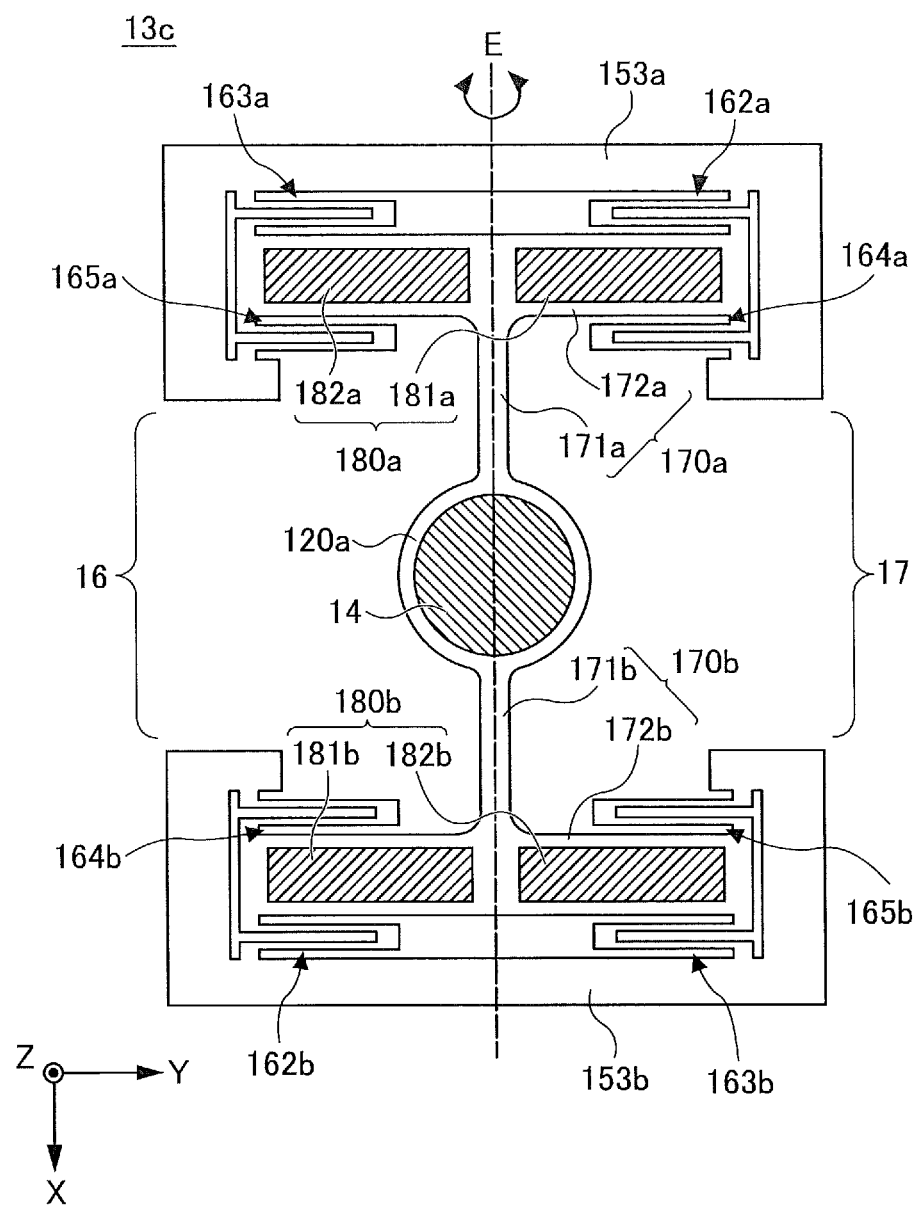
FIG. 19 is a plan view of a movable device according to a first modification of the third embodiment of the present disclosure.

FIG. 19 is a plan view of a movable device 13*c* according to a first modification of the third embodiment of the present disclosure. As illustrated in FIG. 19, the movable device 13*c* according to the present modification of the third embodiment includes springs 164*a*, 165*a*, 164*b*, and 165*b*, in addition to the springs 162*a*, 163*a*, 162*b*, and 163*b*.

Similarly to the first embodiment, the supporting units 153*a* and 153*b* according to the first modification of the third embodiment are provided with the opening portions 16 and 17 at a part of the frame member of the supporting units 153*a* and 153*b*, which makes the supporting units 153*a* and 153*b* separate from each other with the opening portions 16 and 17 between the supporting units 153*a* and 153*b*.

The spring 164*a* has one end coupled to the movable beam 172*a* and the other end coupled to the supporting unit 153*a*. The spring 164*a* and the spring 162*a* are arranged symmetrically about the movable beam 172*a* in the X direction. The spring 165*a* has one end coupled to the movable beam 172*a* and the other end coupled to the supporting unit 153*a*. The spring 165*a* and the spring 163*a* are arranged symmetrically about the movable beam 172*a* in the X direction.

The spring 164*b* has one end coupled to the movable beam 172*b* and the other end coupled to the supporting unit 153*b*. The spring 164*b* and the spring 162*b* are arranged symmetrically about the movable beam 172*b* in the X direction. The spring 165*b* has one end coupled to the movable beam 172*b* and the other end coupled to the supporting unit 153*b*. The spring 165*b* and the spring 163*b* are arranged symmetrically about the movable beam 172*b* in the X direction.

The springs 162*a*, 163*a*, 162*b*, 163*b*, 164*a*, 165*a*, 164*b*, and 165*b* are arranged symmetrically about the oscillation axis E.

The other elements of the movable device 13*c* according to the present modification have the same configurations as in the movable device 13*b* according to the third embodiment.

Figure 20:
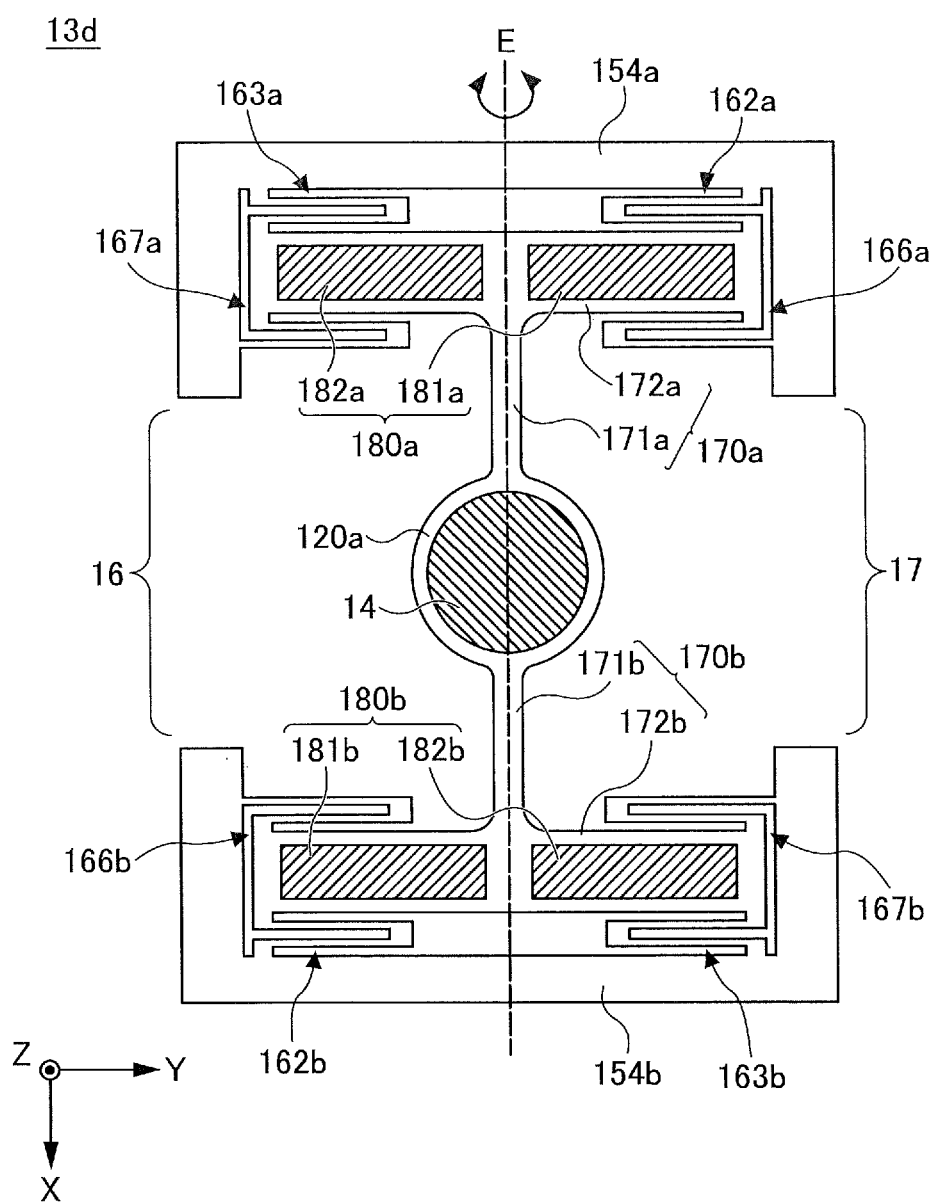
FIG. 20 is a plan view of a movable device according to a second modification of the third embodiment of the present disclosure.

FIG. 20 is a plan view of a movable device 13*d* according to a second modification of the third embodiment of the present disclosure. As illustrated in FIG. 20, the movable device 13*d* according to the present modification includes springs 166*a*, 167*a*, 166*b*, and 167*b*, in addition to the springs 162*a*, 163*a*, 162*b*, and 163*b*.

Similarly to the first embodiment, the supporting units 154*a* and 154*b* according to the second modification of the third embodiment second embodiment are provided with the opening portions 16 and 17 at a part of the frame member of the supporting units 154*a* and 154*b*. Accordingly, the supporting units 154*a* and 154*b* are separate from each other with the opening portions 16 and 17 between the supporting units 154*a* and 154*b*.

The springs 166*a*, 167*a*, 166*b*, and 167*b* have the same configuration as the configuration of the springs 164*a*, 165*a*, 164*b*, and 165*b* according to the first modification except for the shape of the connecting part of the supporting units 154*a* and 154*b*.

The other elements of the movable device 13*d* according to the present modification have the same configuration as in the movable device 13*b* according to the third embodiment.

Figure 21:
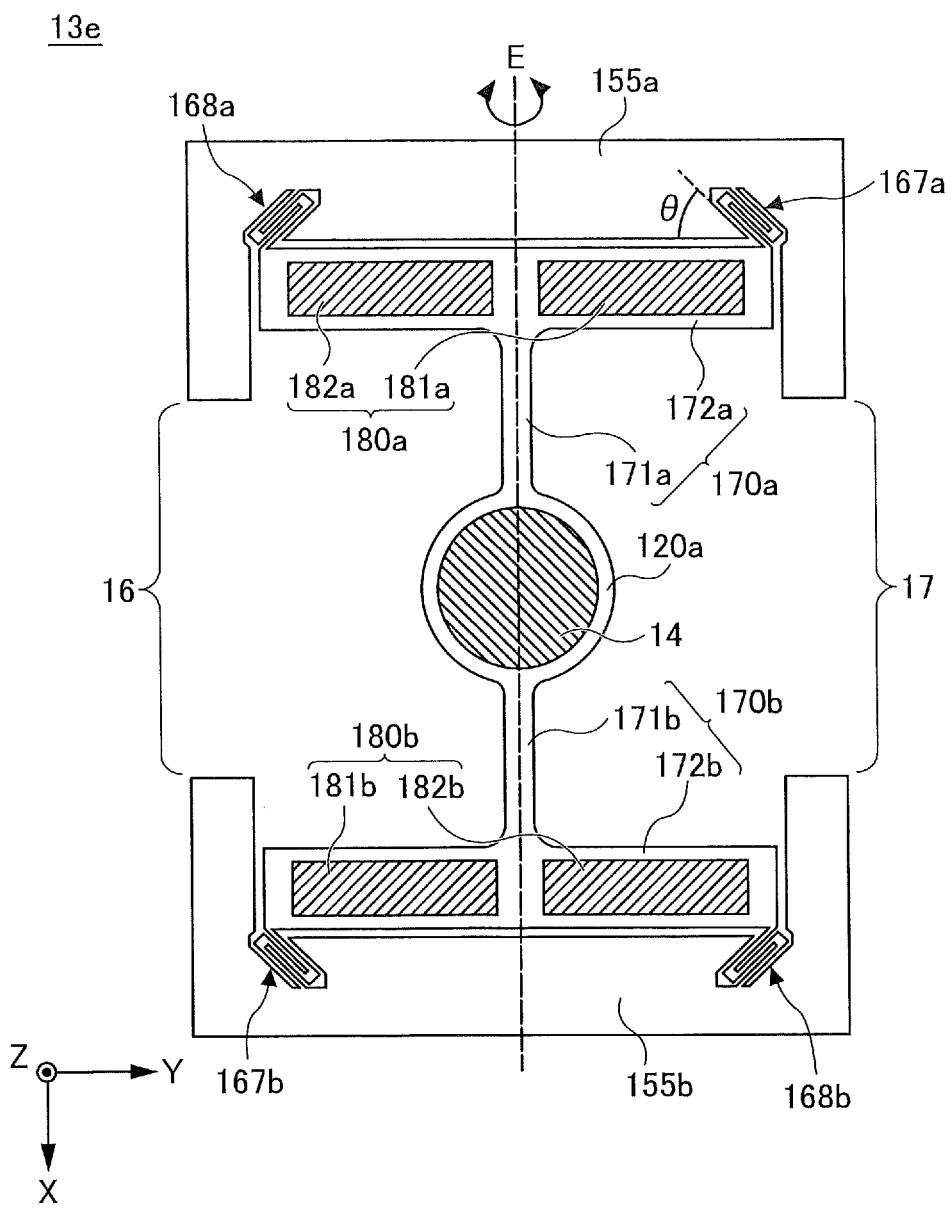
FIG. 21 is a plan view of a movable device according to a fourth embodiment of the present disclosure.

FIG. 21 is a plan view of a movable device according to a fourth embodiment of the present disclosure. As illustrated in FIG. 21, the movable device 13*e* according to the present embodiment differs from the third embodiment in the structure of the springs 167*a*, 168*a*, 167*b*, and 168*b*.

Similarly to the first embodiment, the supporting units 155*a* and 155*b* according to the fourth embodiment are provided with the opening portions 16 and 17 at a part of the frame member of the supporting units 155*a* and 155*b*. Accordingly, the supporting units 155*a* and 155*b* are separate from each other with the opening portions 16 and 17 between the supporting units 155*a* and 155*b*.

Similarly to the third embodiment, the springs 167*a*, 168*a*, 167*b*, 168*b* are meandering springs of the bending structure (the meandering structure). Unlike the third embodiment, in the present embodiment, the longitudinal direction of the springs 167*a*, 168*a*, 167*b*, and 168*b* is not the same as the longitudinal direction of the movable beams 172*a* and 172*b*. An angle θ formed by the longitudinal direction of the springs 167*a*, 168*a*, 167*b*, and 168*b* and the longitudinal direction (the Y direction) of the movable beams 172*a* and 172*b* is within the range that is greater than 0° and less than 90° (0°<θ<90°). In this embodiment, θ is equal to 45° (θ=45°).

The springs 167*a* and 168*a* are arranged symmetrically about the oscillation axis E. The springs 167*b* and 168*b* are arranged symmetrically about the oscillation axis E. With such an arrangement of the springs, the spring constants of the springs in the respective directions become symmetric with respect to the oscillation axis E. This gives stability to the oscillation mode.

Each of the springs 167*a* and 168*a* has one end coupled to the movable beam 172*a* and the other end coupled to the supporting unit 155*a*. Each of the springs 167*b* and 168*b* has one end coupled to the movable beam 172*b* and the other end coupled to the supporting unit 155*b*.

The other elements of the movable device 13*e* according to the present embodiment have the same configurations as in the movable device 13*b* according to the third embodiment.

In the present embodiment, the angle θ formed by the longitudinal direction of the springs 167*a*, 168*a*, 167*b*, and 168*b* and the longitudinal direction of the movable beams 172*a* and 172*b* is within the range that is greater than 0° and less than 90° (0°<θ<90°). Accordingly, even if the supporting units 155*a* and 155*b* are misaligned in two directions, the direction of the oscillation axis E (the X direction) and the direction orthogonal to the oscillation axis E (the Y direction) during the packaging of the movable device 13e, during the mounting of the movable device 13e on the circuit board, or with temperature changes, the distortion of the movable parts 170a and 170b is substantially prevented and the fluctuation in the resonance frequency is also substantially prevented.

In the movable device according to the first embodiment to the fourth embodiment, the supporting units are made separate from each other by providing an opening on each side of the reflector in the direction (Y direction) orthogonal to the oscillation axis. This configuration prevents the light reflected by the reflector from being blocked by the supporting unit.

By contrast, in the movable device according to the fifth embodiment, the supporting units are made separate from each other by providing opening portions in the direction of the oscillation axis of the reflector. This configuration the driving force of the drive circuit and also increases the deflection angle of the movable part.

Figure 22:
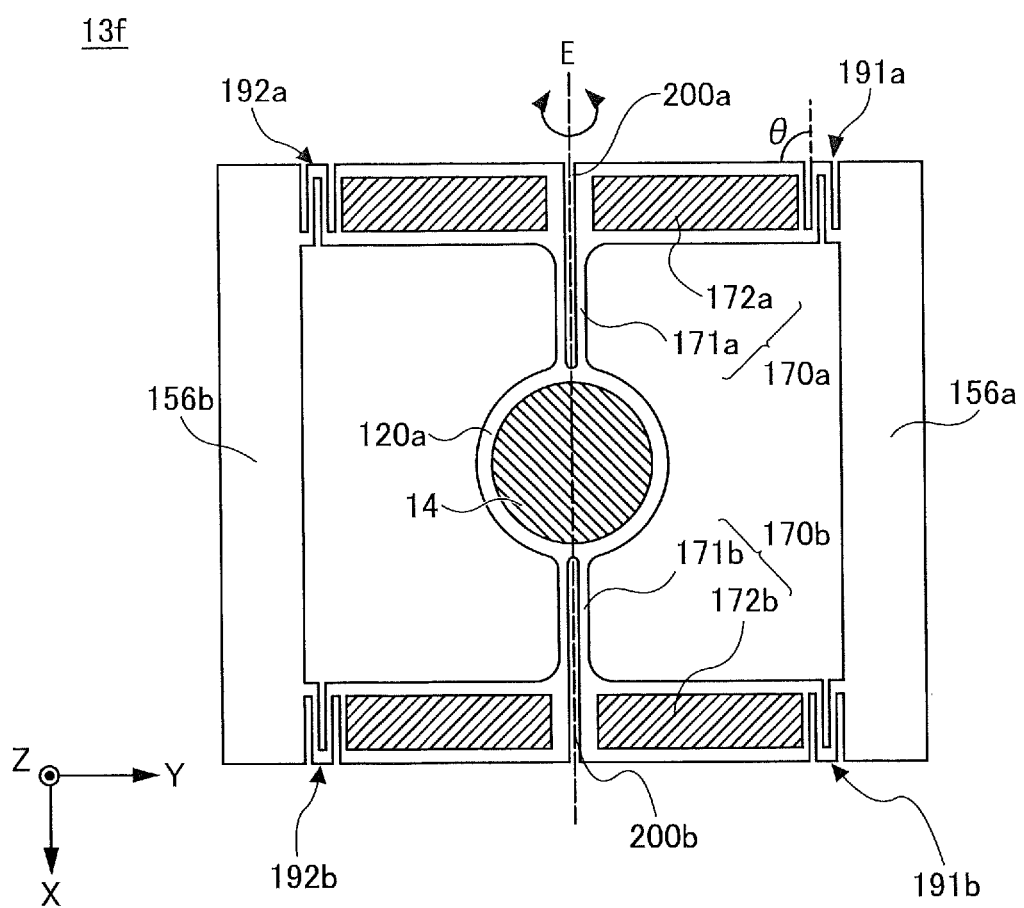
FIG. 22 is a plan view of a movable device according to a fifth embodiment of the present disclosure.

FIG. 22 is a plan view of a movable device according to a fifth embodiment of the present disclosure. As illustrated in FIG. 22, in the movable device 13f according to the present embodiment, the supporting units 156a and 156b are made separate from each other in the Y direction by providing an opening portion at one side of the reflector 120a and another opening portion at the other side of the reflector 120a in the direction of the oscillation axis E. Each of the supporting units 156a and 156b is a rectangular member whose longitudinal direction is the X direction.

The reflector 120a and the movable parts 170a and 170b have the substantially same configuration as in the third embodiment. In the present embodiment, the torsion bar 171a is provided with a slit 200a as an opening portion along the oscillation axis E, and the torsion bar 171b is provided with a slit 200b as an opening portion along the oscillation axis E. The slit 200a divides the movable beam 172a into two parts in the Y direction, and the slit 200b divides the movable beam 172b into two parts in the Y direction.

The movable device 13f is provided with four springs 191a, 192a, 191b, and 192b. The spring 191a has one end coupled to the +Y-side end of the movable beam 172a and also has the other end coupled to the −X-side end of the supporting unit 156a. The spring 192a has one end coupled to the −Y-side end of the movable beam 172a and also has the other end coupled to the −X-side end of the supporting unit 156b. The spring 191b has one end coupled to the +Y-side end of the movable beam 172b and also has the other end coupled to the +X-side end of the supporting unit 156a. The spring 192b has one end coupled to the −Y-side end of the movable beam 172b and also has the other end coupled to the +X-side end of the supporting unit 156b.

Similarly to the first embodiment, the springs 191a, 192a, 191b, and 192b are meandering springs of the bending structure (the meandering structure). The springs 191a, 192a, 191b, and 192b have a low rigidity in the direction of the oscillation axis E and a higher rigidity in the direction (the Z direction) orthogonal to the reflecting surface 14.

In the present embodiment, the longitudinal direction of the springs 191a, 192a, 191b, and 192b is parallel to the X direction and is orthogonal to the longitudinal direction (the Y direction) of the movable beams 172a and 172b. An angle θ formed by the longitudinal direction of the springs 191a, 192a, 191b, and 192b and the longitudinal direction (the Y direction) of the movable beams 172a and 172b is within the range that is greater than 0° and less than 90° (0°<θ<90°).

The other elements of the movable device 13f according to the present embodiment have the same configurations as in the movable device 13b according to the third embodiment.

In the present embodiment, since the movable parts 170a and 170b are coupled to the supporting units 156a and 156b via the springs 191a, 192a, 191b, and 192b, the distortion of the movable parts 170a and 170b due to the changes in the spacing between the supporting units 156a and 156b is substantially prevented. Accordingly, the fluctuations in the resonance frequency are substantially prevented. Further, the springs 191a, 192a, 191b, and 192b are thicker and more rigid than the movable parts 170a and 170b. This configuration prevents the bending of the springs 191a, 192a, 191b, and 192b when the reflector 120a oscillates, and accordingly the fluctuations in the resonance frequency and the oscillation mode are substantially prevented.

Further, since the springs 191a, 192a, 191b, an 192b are arranged symmetrically about the oscillation axis E, the oscillation mode of the reflector 120a is stabilized.

In the above-described first embodiment to the fifth embodiment, the movable device (the light deflector) capable of deflecting light in one axial direction is described as an example. However, no limitation is intended therein, and the embodiments of the present disclosure are also applicable to a movable device capable of deflecting light in two-axis directions.

Further, in the above-described first embodiment to the fifth embodiment, the supporting units are made separate from each other by providing two opening portions at a part of the supporting units. This is only one example. The supporting unit may be provided with one opening and may not be divided into two parts.

Although the embodiments of the present disclosure have been described above, the present disclosure is not limited to such specific embodiments, and various modifications and changes can be made without departing from the spirit and scope of the present disclosure as set forth in the appended claims.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

The invention claimed is:

1. A light deflector comprising:
    a reflector having a reflecting surface;
    a movable part coupled to the reflector;
    a drive circuit configured to cause the movable part to deform so as to oscillate the reflector;
    a frame including a first supporting unit and a second supporting unit, the frame being discontinuous in a region where the reflector is arranged; and
    a spring having a meandering structure disposed between the movable part and each of the first supporting unit and the second supporting unit, the spring coupled to the movable part and each of the first supporting unit and the second supporting unit.

2. The light deflector according to claim 1,
    wherein the spring is less rigid than the movable part in a direction of an oscillation axis of the reflector and is more rigid than the movable part in a direction orthogonal to the reflecting surface.

3. The light deflector according to claim 1,
wherein an opening is provided at one side of the reflector, and another opening is provided at the other side of the reflector in a direction orthogonal to a direction of an oscillation axis of the reflector.

4. The light deflector according to claim 3,
wherein the movable part has a meandering structure in which a plurality of movable beams is arranged in parallel and coupled to each other, and
wherein the drive circuit is a piezoelectric element disposed on each of the movable beams.

5. The light deflector according to claim 4,
wherein a longitudinal direction of the spring is the same direction as a longitudinal direction of each of the movable beams.

6. The light deflector according to claim 4,
wherein an angle formed by a longitudinal direction of the spring and a longitudinal direction of each of the movable beams is greater than 0° and less than 90°.

7. The light deflector according to claim 3,
wherein the movable part includes a plurality of movable parts, each of the movable parts including a torsion bar and a movable beam, and each torsion bar is coupled to the reflector and a corresponding one of the movable beams,
wherein the drive circuit is a piezoelectric element disposed on each of the movable beams.

8. The light deflector according to claim 7,
wherein a longitudinal direction of the spring is the same direction as a longitudinal direction of each of the movable beams.

9. The light deflector according to claim 7,
wherein an angle formed by a longitudinal direction of the spring and a longitudinal direction of each of the movable beams is greater than 0° and less than 90°.

10. The light deflector according to claim 1,
wherein an opening is provided at one side of the reflector, and another opening is provided at the other side of the reflector in a direction of an oscillation axis.

11. The light deflector according to claim 1,
wherein the spring includes a plurality of springs arranged symmetrically about an oscillation axis of the reflector.

12. A LiDAR device comprising the light deflector according to claim 1.

13. The light deflector according to claim 1,
wherein the spring is thicker than the movable part in a direction orthogonal to the reflecting surface.

14. The light deflector according to claim 1,
wherein the first supporting unit and the second supporting unit are discontinuous across the reflector in a direction of an oscillation axis of the reflector.

15. The light deflector according to claim 1,
wherein the spring is narrower than the movable part in a direction of an oscillation axis of the reflector.

16. The light deflector according to claim 1,
wherein the first supporting unit and the second supporting unit face each other across the reflector.

* * * * *